US012323870B2

(12) United States Patent
Moreno et al.

(10) Patent No.: US 12,323,870 B2
(45) Date of Patent: Jun. 3, 2025

(54) SEAMLESS HANDOFF BETWEEN WIRELESS ACCESS POINTS (APs) WITH USE OF PRE-CONVERGENCE PACKET REPLICATION

(71) Applicant: Cisco Technology, Inc., San Jose, CA (US)

(72) Inventors: Victor M. Moreno, Carlsbad, CA (US); Sanjay K. Hooda, Pleasanton, CA (US); Errol Fenton Roberts, Ardsley, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 567 days.

(21) Appl. No.: 17/536,874

(22) Filed: Nov. 29, 2021

(65) Prior Publication Data

US 2023/0171662 A1 Jun. 1, 2023

(51) Int. Cl.
*H04W 36/00* (2009.01)
*H04W 36/18* (2009.01)
*H04W 36/32* (2009.01)

(52) U.S. Cl.
CPC ....... *H04W 36/18* (2013.01); *H04W 36/0058* (2018.08); *H04W 36/0061* (2013.01); *H04W 36/00835* (2018.08); *H04W 36/326* (2023.05)

(58) Field of Classification Search
CPC ....... H04W 36/0022; H04W 36/00222; H04W 36/0055; H04W 36/0058; H04W 36/0061; H04W 36/0083; H04W 36/00835; H04W 36/008357; H04W 35/00837;

(Continued)

(56) References Cited

U.S. PATENT DOCUMENTS

| 9,998,356 | B2 | 6/2018 | Moreno et al. |
| 10,469,381 | B2 | 11/2019 | Moreno et al. |
| 10,516,544 | B2 | 12/2019 | Moreno et al. |
| 10,659,953 | B2 | 5/2020 | Desai et al. |
| 10,715,633 | B2 | 7/2020 | Mukund et al. |
| 10,791,004 | B2 | 9/2020 | Jain et al. |
| 11,159,447 | B2 | 10/2021 | Vasseur et al. |
| 2007/0249291 | A1* | 10/2007 | Nanda ............... H04W 36/08 455/73 |

(Continued)

OTHER PUBLICATIONS

A. Rodriguez-Natal, et al., "Publish/Subscribe Functionality for LISP," draft-ietf-lisp-pubsub-09, LISP Working Group, Internet-Draft, Intended status: Experimental, Jun. 28, 2021, 14 pages.

(Continued)

*Primary Examiner* — Matthew W Genack
(74) *Attorney, Agent, or Firm* — Edell, Shapiro & Finnan, LLC

(57) ABSTRACT

A wireless telemetry process (WTP) may obtain telemetry data which includes signal strength information associated with a plurality of fabric wireless access points (APs) of a network fabric. The WTP may identify that a signal strength between a current AP and a wireless endpoint is below a threshold. In response, the WTP may select addresses of a set of handoff candidate APs for the wireless endpoint based on the signal strength information. The WTP may communicate, to a map server, a message to register, as entries in a replication list, a plurality of routing locators associated with the addresses of the set of handoff candidate APs for association with an address of the wireless endpoint. The map server may notify a router of the replication list, for replicating packets intended for the wireless endpoint to a plurality of routers that are connected to the set of handoff candidate APs.

20 Claims, 16 Drawing Sheets

(58) Field of Classification Search
CPC ......... H04W 36/0085; H04W 36/0088; H04W 36/0094; H04W 36/18; H04W 36/32
See application file for complete search history.

(56) References Cited

U.S. PATENT DOCUMENTS

| | | | |
|---|---|---|---|
| 2013/0235728 | A1 | 9/2013 | Le et al. |
| 2015/0163323 | A1 | 6/2015 | Moreno et al. |
| 2016/0134526 | A1 | 5/2016 | Maino et al. |
| 2017/0019328 | A1 | 1/2017 | Moreno et al. |
| 2017/0339623 | A1* | 11/2017 | Pillay-Esnault ........ H04L 45/74 |
| 2018/0007604 | A1 | 1/2018 | Pillay-Esnault |
| 2019/0081890 | A1* | 3/2019 | Ravindran ............ H04L 45/741 |
| 2019/0165969 | A1 | 5/2019 | Liu et al. |
| 2019/0223236 | A1 | 7/2019 | Sebastian et al. |
| 2019/0261239 | A1* | 8/2019 | Wang .................. H04W 36/302 |
| 2020/0136973 | A1 | 4/2020 | Rahman et al. |
| 2020/0167258 | A1* | 5/2020 | Chattopadhyay ..... G06F 9/5088 |
| 2020/0169979 | A1* | 5/2020 | Trapanese ............. H04W 80/04 |
| 2020/0245206 | A1* | 7/2020 | Allan ...................... H04L 45/04 |
| 2020/0296007 | A1 | 9/2020 | Finn, II et al. |
| 2021/0112480 | A1 | 4/2021 | Pillay-Esnault |
| 2021/0119971 | A1 | 4/2021 | Radhakrishnan et al. |
| 2021/0314249 | A1 | 10/2021 | Jain et al. |

OTHER PUBLICATIONS

D. Farinacci, et al., "LISP Predictive RLOCs," draft-ietf-lisp-predictive-rlocs-09, Network Working Group, Internet-Draft, Intended status: Experimental, Oct. 18, 2021, 16 pages.

Zhang, X., et al., "Spatial Indexing. The Geographic Information Science & Technology Body of Knowledge (4th Quarter 2017 Edition)," Dec. 28, 2017, 7 pages.

"SD-Access Wireless Architecture," DC Lessons, https://www.dclessons.com/sd-access-wireless-architecture, Apr. 16, 2020, 7 pages.

"HomeWirelessWireless Infrastructure Analysis: Local Mode Vs Flex Connect Wireless Infrastructure Analysis: Local Mode Vs Flex Connect," The Network DNA Networks Baseline, htttps://www.thenetworkdna.com/2020/10/wireless-infrastructure-analysis-local.html, Oct. 5, 2020, 3 pages.

"FlexConnect," Cisco, Oct. 22, 2021, 50 pages.

Isaac Brodsky, "H3: Uber's Hexagonal Hierarchical Spatial Index," Uber Engineering, https://eng.uber.com/h3/, Jun. 27, 2018, 13 pages.

Christian Gauer, Sr., "Cisco DNA Spaces," Cisco Live!, BRKEWN-2012, Jan. 27-31, 2020, 108 pages.

Peter Welcher., "SD-Access Wireless," NetCraftsmen, https://netcraftsmen.com/sd-access-wireless/, Jan. 29, 2021, 10 pages.

Janos Farkas, "Focus on the Time Sensitive Networking Task Group," IEEE, Introduction to IEEE 802.1, May 15, 2017, 50 pages.

János Farkas, "TSN Basic Concepts," Ericsson Research, Nov. 11, 2018, DetNet—TSN workshop, 20 pages.

"SD-Access Wireless Design and Deployment Guide Cisco DNA Center 1.3.3," Cisco, Jan. 27, 2021, 106 pages.

Flavio Correa, "SD-Access Wireless Integration," Cisco Livel, BRKEWN-2020, Dec. 4-7, 2018, 118 pages.

Andrea Galvani, et al., "LISP-ROAM: Network-based Host Mobility with LISP," Porto Institutional Repository, Sep. 2014, 7 pages.

V. Moreno, et al., "Signal-Free Locator/ID Separation Protocol (LISP) Multicast," Internet Engineering Task Force (IETF), Request for Comments: 8378, Category: Experimental, ISSN: 2070-1721, May 2018, 21 pages.

* cited by examiner

SEAMLESS HANDOFF BETWEEN WIRELESS ACCESS POINTS (APs) WITH USE OF PRE-CONVERGENCE PACKET REPLICATION

TECHNICAL FIELD

The present disclosure relates generally to telecommunications systems, and more particularly to techniques and mechanisms for enabling a seamless handoff of a wireless terminal between wireless access points (APs) in a network fabric with use of pre-convergence packet replication.

BACKGROUND

Wireless network deployments may include a network fabric in which overlays are utilized for host communications. For example, a wireless network deployment may be part of a network fabric which is a software-defined networking (SDN) fabric or a software-defined access (SDA) fabric. Mobility in these wireless network deployments should be seamless. Today, there is much work being done to optimize the wireless stack to achieve a fast handoff of wireless endpoints between wireless access points (APs). In environments in which the data path for wireless communications is provided by the supporting wired network, fast convergence is also required in the wired network. Ideally, the wired network should pre-converge and eliminate any wired network convergence delay that may impact the speed of roaming for the wireless endpoint.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1A:
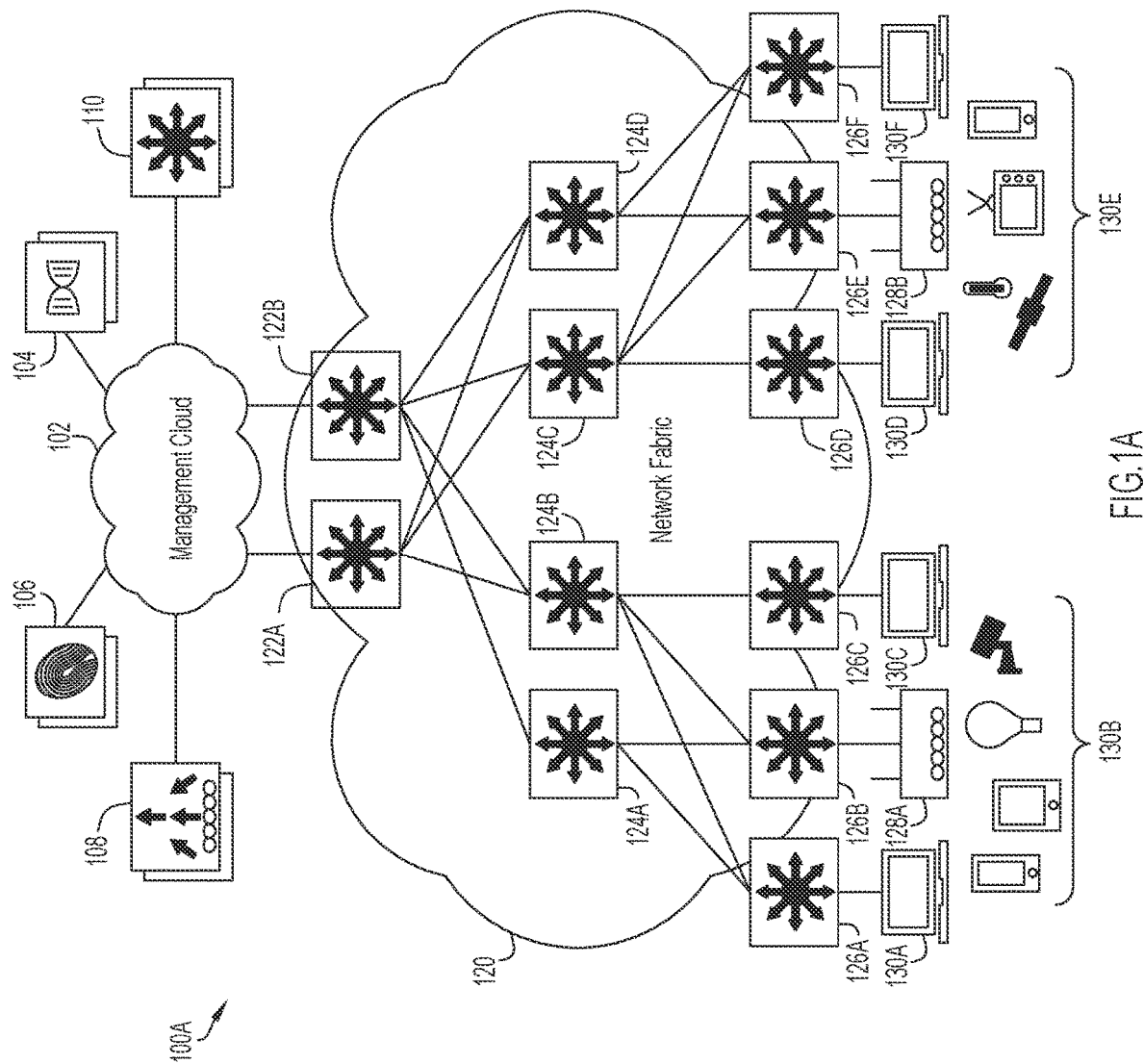
FIG. 1A illustrates an example of a physical topology for an enterprise network including a management cloud and a network fabric, which is one environment in which techniques and mechanisms of the present disclosure may be practiced.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for enabling a seamless handoff of a wireless endpoint between wireless access points (APs) in a network fabric with use of pre-convergence packet replication are described herein.

In one illustrative example, a wireless telemetry process (WTP) of a wireless local area network (LAN) controller (WLC) or a cloud server may be configured with functionality to assist in such pre-convergence packet replication. The wireless telemetry process may operate to obtain telemetry data which includes signal strength information associated with a plurality of wireless APs of the network fabric. The wireless telemetry process may identify that a signal strength between a current wireless AP and a wireless endpoint is below a threshold. In response, the wireless telemetry process may select addresses of a set of handoff candidate wireless APs for the wireless endpoint based on the signal strength information. The wireless telemetry process may communicate, to a map server, a message to register, as entries in a replication list, a plurality of routing locators associated with the addresses of the set of handoff candidate wireless APs for association with an address of the wireless endpoint. The map server may notify a router of the replication list, for replicating packets intended for the wireless endpoint to a plurality of routers that are connected to the set of handoff candidate wireless APs.

More detailed and alternative techniques and implementations are provided herein as described below.

EXAMPLE EMBODIMENTS

An example of a network architecture for implementing aspects of the present technology is described below. However, one of ordinary skill in the art will understand that, for the network architecture and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

Enterprise networks may be designed and deployed to provide wireless network access for general-purpose computing devices (e.g., servers, workstations, desktop computers, laptop computers, tablets, mobile phones, etc.) and things (e.g., desk phones, security cameras, lighting, windows, doors, locks, medical devices, industrial and manufacturing equipment, and other Internet of Things "IoT" devices) (sometimes also referred to as clients, servers, hosts, computing systems, endpoints, electronic devices, user devices, user equipment (UE) devices, etc.) within environments such as offices, hospitals, colleges and universities, oil and gas facilities, factories, and similar locations. With wireless network access, these devices may connect to private networks (e.g., campus or access networks, data centers, branch networks, etc.) and public networks (e.g., the Internet, Infrastructure as a Service "IaaS" networks, Platform as a Service "PaaS" networks, Software as a Service "SaaS" networks, other Cloud Service Provider "CSP" networks, etc.) without being tethered to a specific location. The wireless network access technologies may include Wireless Personal Area Networks (WPANs), Wi-Fi (e.g., Institute of Electrical Electronic Engineers "IEEE" 802.11x, such as 802.11a, 802.11h, 802.11g, 802.11n, 802.11ac, 802.11ax, etc.) or Wireless Local Area Networks (WLANs), and Wireless Wide Area Networks (WWANs) or cellular networks (e.g., Fourth Generation "4G"/Long-Term Evolution "LTE," Fifth Generation "5G," etc.).

Another wireless network access technology that may be integrated by enterprise networks is Citizens Broadband Radio Service (CBRS) (sometimes also referred to as private LTE, private 5G, OnGo, etc.). CBRS operates in a 210 MHz wide spectrum of the 3.5 GHz band (e.g., 3550-3700 MHz frequency range in the United States), and thus CBRS is unlikely to interfere or be interfered with by Wi-Fi and cellular devices. For some devices, like life-sustaining medical equipment that need guaranteed, always-on connectivity or industrial IoT devices or other robots that have specific mobility requirements, CBRS may complement Wi-Fi, cellular, and other wireless networks.

Wi-Fi, cellular, and CBRS networks have different advantages and drawbacks relative to one another. Building a cellular network to provide ubiquitous, robust connectivity (e.g., backhaul links cannot be cut, cellular network infrastructure is often restored first after a disaster, etc.) to devices operating across vast distances may be a costly endeavor that relies on monthly and metered subscriptions to cover expenses. Wi-Fi network equipment may connect devices within the same general physical location, such as a home or a building, and is relatively inexpensive in comparison. In addition, Wi-Fi operates in unlicensed frequencies that do not require bidding for rights to use them. Mobile and cellular standards are also different from Wi-Fi in that a cellular device can require a significantly higher license cost for the technology itself. For example, Wi-Fi devices, which are based on IEEE standards, can have a per-device cost for associated licenses that is dramatically lower than for LTE/4G or 5G devices.

Cellular networks may be suitable for mobile use in cases in which it may be critical for a user to have a consistent, persistent connection. For example, a mobile user may walk from place to place while making a phone call, answer email from a bus, or stream a podcast while driving, and so on. These may be situations in which the user may be intolerant of gaps in network coverage. The mobile user is also unlikely to consume a lot of data under these circumstances. Wi-Fi and CBRS networks, on the other hand, may be particularly suitable for nomadic usage where it may be more important to have a stable connection (e.g., relatively more tolerant of coverage gaps) and to be able to consume large amounts of data at little to no cost. For example, a nomadic user may decamp from place to place but may sit down for extended periods of time to do data-intensive work, such as receiving large files, editing them, and sending them back online. The same users, on the same devices, may be mobile users or nomadic users at different periods of times, and network operators are beginning to incorporate Wi-Fi, cellular, and CBRS network infrastructure into their own networks for increased flexibility, availability, and capacity, among other benefits. However, it can be challenging to manage these separate access technologies as integrated systems with unified policy, security, and analytics in view of the differences among them in terms of cost, infrastructure layout, the level of administrative control they may provide, and the like. Users and devices need to move between these different wireless systems, and network operators want the experience to be seamless and easy to manage at scale.

Turning now to the drawings, FIG. 1A illustrates an example of an enterprise network 100A. It should be understood that, for enterprise network 100A and any network discussed herein, there may be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, enterprise network 100A may include any number or type of resources, which may be accessed and utilized by endpoints or network devices. The illustrations and examples provided herein are for clarity and simplicity.

In this example, enterprise network 100A includes a management cloud 102 and a network fabric 120. Although shown as an external network or cloud to network fabric 120 in this example, management cloud 102 may alternatively or additionally reside on the premises of an organization or in a colocation center (e.g., in addition to being hosted by a cloud provider or similar environment). Management cloud 102 may provide a central management plane for building and operating network fabric 120. Management cloud 102 may be responsible for forwarding configuration and policy distribution, as well as device management and analytics. Management cloud 102 may comprise one or more network controller appliances 104, one or more authentication, authorization, and accounting (AAA) appliances 106, wireless network infrastructure equipment 108 (e.g., Wireless Local Area Network "LAN" Controllers "WLCs," Evolved Packet Core "EPC" equipment, 4G/LTE or 5G Core "5GC" network equipment, etc.), and one or more fabric control plane nodes 110. In some implementations, one or more elements of management cloud 102 may be co-located with network fabric 120.

Network controller appliances 104 may function as a command and control system for one or more network fabrics, and may house automated workflows for deploying and managing the network fabrics. Network controller appliances 104 may include automation, design, policy, provisioning, and assurance capabilities, among others, as discussed further below with respect to FIG. 2. In some embodiments, one or more Cisco Digital Network Architecture (Cisco DNA™) appliances may operate as network controller appliances 104.

AAA appliances 106 may control access to computing resources, facilitate enforcement of network policies, audit usage, and provide information necessary to bill for services. AAA appliance may interact with network controller appliances 104 and with databases and directories containing information for users, devices, things, policies, billing, and similar information to provide authentication, authorization, and accounting services. In some embodiments, AAA appliances 106 may utilize Remote Authentication Dial-In User Service (RADIUS) or Diameter to communicate with devices and applications. In some embodiments, one or more Cisco® Identity Services Engine (ISE) appliances may operate as AAA appliances 106.

Wireless network infrastructure equipment 108 may support fabric-enabled base stations and access points (APs) attached to network fabric 120, handling traditional tasks associated with a WLC or 4G/LTE or 5G Core network equipment as well as interactions with the fabric control plane for wireless endpoint registration and roaming. In some embodiments, network fabric 120 may implement a wireless deployment that moves data-plane termination (e.g., Virtual Extensible Local Area Network "VXLAN") from a centralized location (e.g., with previous overlay Control and Provisioning of Wireless Access Points "CAPWAP" deployments) to a wireless base station or access point/fabric edge node. This may enable distributed forwarding and distributed policy application for wireless traffic while retaining the benefits of centralized provisioning and administration. In some embodiments, one or more Cisco® Catalyst® controllers, Cisco® Wireless Controllers, Cisco® Wireless Local Area Network, and/or other Cisco DNA™-ready wireless controllers may operate as wireless network infrastructure equipment 108.

Both fabric WLCs and non-fabric WLCs provide AP image and configuration management, client session management, and mobility services. Fabric WLCs provide additional services for fabric integration such as registering Media Access Control (MAC) addresses of wireless clients into a host tracking database (HTDB) of the fabric control plane nodes during wireless client join events and supplying fabric edge node routing locator (RLOC) association updates to the HTDB during client roam events.

In a traditional non-fabric deployment, both control traffic and data traffic are tunneled back to the WLC using CAPWAP. From a CAPWAP control plane perspective, AP management traffic is generally lightweight, and it is the client data traffic that is generally the larger bandwidth consumer. Wireless standards have allowed larger and larger data rates for wireless clients, resulting in more and more client data that is tunneled back to the WLC. The requires a larger WLC with multiple high-bandwidth interfaces to support the increase in client traffic. In non-fabric wireless deployments, wired and wireless traffic have different enforcement points in the network. Quality of service and security are addressed by the WLC when it bridges the wireless traffic onto the wired network. For wired traffic, enforcement is addressed by the first-hop access layer switch. On the other hand, in SD-Access Wireless, the CAPWAP tunnels between the WLCs and APs are used for control traffic only. Data traffic from the wireless endpoints is tunneled to the first-hop fabric edge node where security and policy may be applied at the same point as with wired traffic.

Typically, fabric WLCs connect to a shared services network though a distribution block or data center network that is connected outside the fabric and fabric border, and the Internet Protocol (IP) for WLC management exists in a global routing table. For wireless APs to establish a CAPWAP tunnel for WLC management, the APs must be in a virtual network that has access to this external device. This means that the APs are deployed in the global routing table and that the WLC's address be present in the global routing table within the fabric site. In the SD-Access solution, the Cisco DNA Center configures wireless APs to reside within an overlay virtual network (e.g., named "INFRA_VN") which maps to the global routing table. This avoids the need for route leaking or fusion routing (a multi-Virtual Routing and Forwarding "VRF" device for selectively sharing routing information) to establish connectivity between the WLCs and the APs. Here, each fabric site may have a WLC unique to that site. Most deployments place the WLC in the local fabric site itself, not across a wide area network (WAN), because of latency requirements for local mode APs.

Network fabric 120 may comprise fabric border nodes 122A and 122B (collectively, fabric border nodes 122A-122B), fabric intermediate nodes 124A, 124B, 124C, and 124D (collectively, fabric intermediate nodes 124A-124D), and fabric edge nodes 126A, 126B, 126C, 126D, 126E, and 126F (collectively, fabric edge nodes 126A-126F). Although fabric control plane nodes 110 are shown to be external to network fabric 120 in this example, in other implementations, fabric control plane nodes 110 may be co-located with network fabric 120. In implementations where fabric control plane nodes 110 are co-located with network fabric 120, fabric control plane nodes 110 may comprise a dedicated node or set of nodes or the functionality of fabric control plane nodes 110 may be implemented by fabric border nodes 122A-122B.

Fabric control plane nodes 110 may serve as a central database for tracking all users, devices, and things as they attach to network fabric 120, and as they roam around. Fabric control plane nodes 110 may allow network infrastructure (e.g., switches, routers, WLCs, etc.) to query the database to determine the locations of users, devices, and things attached to the fabric instead of using a flood and learn mechanism. In this manner, fabric control plane nodes 110 may operate as a single source of truth about where every endpoint attached to network fabric 120 is located at any point in time. In addition to tracking specific endpoints (e.g., /32 address for IP version 4 "IPv4," /128 address for IP version 6 "IPv6," etc.), fabric control plane nodes 110 may also track larger summarized routers (e.g., IP/mask). This flexibility may help in summarization across fabric sites and improve overall scalability.

Fabric border nodes 122A-122B may connect network fabric 120 to traditional Layer 3 networks (e.g., non-fabric networks) or to different fabric sites. Fabric border nodes 122A-122B may also translate context (e.g., user, device, or thing mapping and identity) from one fabric site to another fabric site or to a traditional network. When the encapsulation is the same across different fabric sites, the translation of fabric context is generally mapped 1:1. Fabric border nodes 122A-122B may also exchange reachability and policy information with fabric control plane nodes of different fabric sites. Fabric border nodes 122A-122B also provide border functions for internal networks and external networks. Internal borders may advertise a defined set of known subnets, such as those leading to a group of branch sites or to a data center. External borders, on the other hand, may advertise unknown destinations (e.g., to the Internet similar in operation to the function of a default route). Fabric intermediate nodes 124A-124D may operate as pure Layer 3 forwarders that connect fabric border nodes 122A-122B to fabric edge nodes 126A-126F and provide the Layer 3 underlay for fabric overlay traffic.

Fabric edge nodes 126A-126F may connect endpoints to network fabric 120 and may encapsulate/decapsulate and forward traffic from these endpoints to and from network fabric 120. Fabric edge nodes 126A-126F may operate at the perimeter of network fabric 120 and may be the first points for attachment of users, devices, and things and the implementation of policy. In some implementations, network fabric 120 may also include fabric extended nodes (not shown) for attaching downstream non-fabric Layer 2 network devices to network fabric 120 and thereby extend network fabric 120. For example, extended nodes may be small switches (e.g., compact switch, industrial Ethernet switch, building automation switch, etc.) which connect to fabric edge nodes 126A-126F via Layer 2. Devices or things connected to the fabric extended nodes may use fabric edge nodes 126A-126F for communication to outside subnets.

In some implementations, all subnets hosted in a fabric site may be provisioned across (every one of) fabric edge nodes 126A-126F in that fabric site. For example, if the subnet 10.10.10.0/24 is provisioned in a given fabric site, this subnet may be defined across (all of) f fabric edge nodes 126A-126F in that fabric site, and endpoints located in that subnet may be placed on any one of fabric edge nodes 126A-126F in that fabric. This approach may simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices may operate as fabric border nodes 122A-122B, fabric intermediate nodes 124A-124D, and fabric edge nodes 126A-126F Enterprise network 100A may also include wired endpoints 130A, 130C, 130D, and 130F and wireless endpoints 130B and 130E (collectively, endpoints 130A-130F). Wired endpoints 130A, 130C, 130D, and 130F may connect by wire to fabric edge nodes 126A, 126C, 126D, and 126F, respectively, and wireless endpoints 130B and 130E may connect wirelessly to wireless base stations and APs 128A and 128B, respectively, which in turn may connect by wire to fabric edge nodes 126B and 126E, respectively. In some embodiments, Cisco® Catalyst® access points, Cisco Aironet® access points, Cisco Meraki® MR access points, and/or other Cisco DNA™-ready access points may operate as wireless base stations and APs 128A and 128B.

Endpoints 130A-130F may include general purpose computing devices (e.g., servers, workstations, desktop computers, etc.), mobile computing devices (e.g., laptops, tablets, mobile phones, etc.), wearable devices (e.g., watches, glasses or other head-mounted displays "HMDs," ear devices, etc.), and so forth. Endpoints 130A-130F may also include IoT devices or equipment, such as agricultural equipment (e.g., livestock tracking and management systems, watering devices, unmanned aerial vehicles "UAVs," etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale "POS" devices, Radio Frequency Identification "RFID" tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, network fabric 120 may support wired and wireless access as part of a single integrated infrastructure such that connectivity, mobility, and policy enforcement behavior are similar or the same for both wired and wireless endpoints. This may bring a unified experience for users, devices, and things that is independent of the access media.

In integrated wired and wireless deployments, control plane integration may be achieved with wireless network infrastructure equipment 108 notifying fabric control plane nodes 110 of joins, roams, and disconnects by wireless endpoints 130B and 130E such that the fabric control plane nodes may have connectivity information about the endpoints in network fabric 120, and may serve as the single source of truth for endpoints connected to the network fabric. For data plane integration, wireless network infrastructure equipment 108 may instruct wireless base stations and APs 128A and 128B to form a VXLAN overlay tunnel to their adjacent fabric edge nodes 126B and 126E. The VXLAN tunnel may carry segmentation and policy information to and from fabric edge nodes 126B and 126E, allowing connectivity and functionality identical or similar to that of a wired endpoint. When wireless endpoints 130B and 130E join network fabric 120 via wireless base stations and APs 128A and 128B, wireless network infrastructure equipment 108 may onboard the endpoints into network fabric 120 and inform fabric control plane nodes 110 of the endpoints' MAC addresses (or other identifiers). Wireless network infrastructure equipment 108 may then instruct wireless base stations and APs 128A and 128B to form VXLAN overlay tunnels to adjacent fabric edge nodes 126B and 126E. Next, wireless endpoints 130B and 130E may obtain IP addresses for themselves via Dynamic Host Configuration Protocol (DHCP). Once that completes, fabric edge nodes 126B and 126E may register the IP addresses of wireless endpoints 130B and 130E to fabric control plane nodes 110 to form a mapping between the endpoints' MAC and IP addresses, and traffic to and from wireless endpoints 130B and 130E may begin to flow.

In some implementations, fabric mode APs are associated with the fabric WLC and are configured with one or more fabric-enabled SSIDs. These fabric APs establish a CAPWAP control plane tunnel to the fabric WLC and may join as local mode APs. Each fabric AP may be directly connected to a corresponding fabric edge node. For their data plane, the fabric APs may establish a VXLAN tunnel to their first-hop fabric edge switch, where wireless client traffic is terminated and placed on the wired network. In some implementations, the fabric APs may be considered a special case wired host. Here, edge nodes may be configured with Cisco Discovery Protocol (CDP) to recognize APs as these wired hosts, apply specific port configurations, and assign the APs to the overlay virtual network (e.g., INFRA_VN). As wired hosts, these access points have a dedicated endpoint ID (EID) space and are registered with the control plane node. In some implementations, the ED-space is associated with the overlay virtual network (e.g., INFRA_VN) in the Cisco DNA Center. It is a common ED-space (e.g., a prefix space) and common virtual network for all fabric APs within a fabric site. The assignment to this overlay virtual network allows management simplification by using a single subnet to cover the AP infrastructure at a fabric site.

Figure 1B:
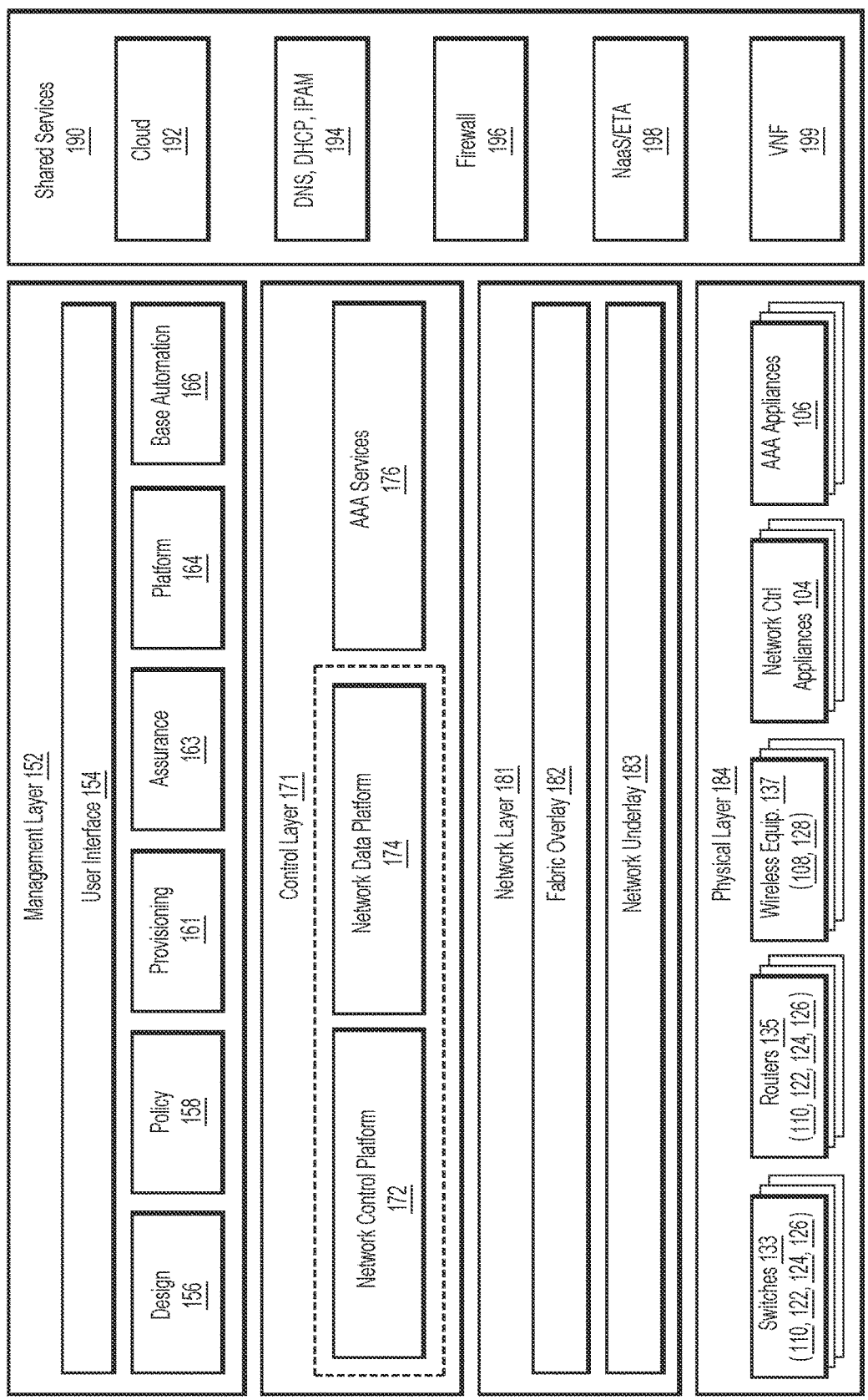
FIG. 1B illustrates an example of a logical architecture for an enterprise network, such as the enterprise network of FIG. 1A, which may be utilized with at least some of the techniques and mechanisms of the present disclosure.

FIG. 1B illustrates an example of a software architecture or logical architecture 100B for an enterprise network. One of ordinary skill in the art will understand that, for logical architecture 100B and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, logical architecture 100B includes a management layer 152, a controller layer 171, a network layer 181, physical layer 184, and a shared services layer 190.

Management layer 152 may abstract the complexities and dependencies of other layers and provide a user with tools and workflows to manage an enterprise network (e.g., enterprise network 100A of FIG. 1A). Management layer 152 may include a user interface 154, design functions 156, policy functions 158, provisioning functions 161, assurance functions 163, platform functions 164, and base automation functions 166. User interface 154 may provide a user a single point to manage and automate the network. User interface 154 may be implemented within a web application/web server accessible by a web browser and/or an application/application server accessible by a desktop application, a mobile app, a shell program or other command line interface (CLI), an Application Programming Interface (e.g., restful state transfer "REST," Simple Object Access Protocol "SOAP," Service Oriented Architecture "SOA," etc.), and/or other suitable interface in which the user may configure network infrastructure, devices, and things that are cloud-managed; provide user preferences; specify policies, enter data; review statistics; configure interactions or operations; and so forth. User interface 154 may also provide visibility information, such as views of a network, network infrastructure, computing devices, and things. For example, user interface 154 may provide a view of the status or conditions of the network, the operations taking place, services, performance, a topology or layout, protocols implemented, running processes, errors, notifications, alerts, network structure, ongoing communications, data analysis, and so forth.

Design functions 156 may include tools and workflows for managing site profiles, maps and floor plans, network settings, and IP address management, among others. Policy functions 158 may include tools and workflows for defining and managing network policies. Provisioning functions 161 may include tools and workflows for deploying the network. Assurance functions 163 may use machine learning and analytics to provide end-to-end visibility of the network by learning from the network infrastructure, endpoints, and other contextual sources of information. Platform functions 164 may include tools and workflows for integrating the network management system with other technologies. Base automation functions 166 may include tools and workflows to support policy functions 158, provisioning functions 161, assurance functions 163, and platform functions 164.

In some embodiments, design functions 156, policy functions 158, provisioning functions 161, assurance functions 163, platform functions 164, and base automation functions 166 may be implemented as microservices in which respective software functions are implemented in multiple containers communicating with each rather than amalgamating all tools and workflows into a single software binary. Each of design functions 156, policy functions 158, provisioning functions 161, assurance functions 163, and platform functions 164 may be viewed as a set of related automation microservices to cover the design, policy authoring, provisioning, assurance, and cross-platform integration phases of the network lifecycle. Base automation functions 166 may support the top-level functions by allowing users to perform certain network-wide tasks.

Controller layer 171 may comprise subsystems for management layer 152 and may include a network control platform 172, a network data platform 174, and AAA services 176. These controller subsystems may form an abstraction layer to hide the complexities and dependencies of managing many network devices and protocols.

Network control platform 172 may provide automation and orchestration services for network and physical layers 181 and 184, and may include the settings, protocols, and tables to automate management of network and physical layers 181 and 184. For example, network control platform 172 may provide design functions 156, policy functions 158, provisioning functions 161, and platform functions 164. In addition, platform functions 164 may include tools and workflows for discovering switches, routers, wireless controllers, and other network devices (e.g., the network discovery tool); maintaining network and endpoint details, configurations, and software versions (e.g., the inventory management tool); Plug-and-Play (PnP) for automating deployment of network infrastructure (e.g., the network PnP tool), Path Trace for creating visual data paths to accelerate the troubleshooting of connectivity problems, Easy Quality of Service (QoS) for automating quality of service to prioritize applications across the network, and Enterprise Service Automation (ESA) for automating deployment of physical and virtual network services, among others. Network control platform 172 may communicate with network devices using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) may operate as network control platform 172.

Network data platform 174 may provide for network data collection, analytics, and assurance, and may include the settings, protocols, and tables to monitor and analyze network infrastructure and endpoints connected to the network. Network data platform 174 may collect multiple types of information from network devices, including System Logging Protocol ("syslog"), SNMP, NetFlow, Switched Port Analyzer (SPAN), and streaming telemetry, among others.

Network data platform 174 may also collect use contextual information shared from the network devices. Syslog is a protocol that may be used to send system log or event messages to a server (e.g., a syslog server). The syslog may collect logs from various devices to monitor and review data.

In some embodiments, one or more Cisco DNA™ Center appliances may provide the functionalities of management layer 152, network control platform 172, and network data platform 174. The Cisco DNA™ Center appliances may support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances may also be cloud-tethered to provide for the upgrade of existing functions and additions of new packages and applications without having to manually download and install them.

AAA services 176 may provide identity and policy services for network and physical layers 181 and 184, and may include the settings, protocols, and tables to support endpoint identification and policy enforcement services. AAA services 176 may provide tools and workflows to manage virtual networks and security groups, and to create group-based policies and contracts. AAA services 176 may identify and profile network devices and endpoints using AAA/RADIUS, 802.1X, MAC Authentication Bypass (MAB), web authentication, and EasyConnect, among others. AAA services 176 may also collect and use contextual information from network control platform 172, network data platform 174, and shared services layer 190, among others. In some embodiments, Cisco® ISE may provide AAA services 176.

Network layer 181 may be conceptualized as a composition of two layers, an underlay 183 comprising physical and virtual network infrastructure (e.g., routers, switches, WLCs, etc.) and a Layer 3 routing protocol for forwarding traffic, and a fabric overlay 182 comprising a virtual topology for logically connecting wired and wireless users, devices, and things and applying services and policies to these entities. Network devices of underlay 183 may establish connectivity between each other, such as via IP. Underlay 183 may use any topology and routing protocol.

In some embodiments, network controller appliances 104 may provide a LAN automation service, such as implemented by Cisco DNA™ Center LAN Automation, to automatically discover, provision, and deploy network devices. Once discovered, the automated underlay provisioning service may leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

Fabric overlay 182 may be a logical, virtualized topology built on top of (the physical) underlay 183, and may include a fabric data plane, a fabric control plane, and a fabric policy plane. In some embodiments, the fabric data plane may be created via packet encapsulation using VXLAN with Group Policy Option (GPO). Some of the advantages of VXLAN-GPO include its support for both Layer 2 and Layer 3 virtual topologies (overlays), and its ability to operate over any IP network with built-in network segmentation.

In some implementations, the fabric control plane may implement Locator/ID Separation Protocol (LISP) for logically mapping and resolving users, devices, and things. LISP may simplify routing by removing the need for each router to process every possible IP destination address and route. LISP may achieve this by moving remote destination to a centralized map database that allows each router to manage only its local routs and query the map system to locate destination endpoints.

The fabric policy plane is where intent may be translated into network policy. That is, the policy plane is where the network operator may instantiate logical network policy based on services offered by the network fabric (network fabric 120 of FIG. 1A), such as security segmentation services, QoS, capture/copy services, application visibility services, and so forth. In some implementations, the network fabric may be a software-defined networking (SDN) fabric or a software-defined access (SDA) fabric. In such environments, segmentation is a method or technology which is utilized to separate specific groups of users or devices from other groups for the purpose of reducing congestion, improving security, containing network problems, controlling access, and so forth. As discussed, the fabric data plane may implement VXLAN encapsulation to provide network segmentation by using the virtual network identifier (VNID) and Scalable Group Tag (SGT) fields in packet headers. Network fabric 120 may support both macro-segmentation and micro-segmentation. Macro-segmentation logically separates a network topology into smaller virtual networks by using a unique network identifier and separate forwarding tables. This may be instantiated as a VRF instance and referred to as a Virtual Network (VN). That is, a virtual network is a logical network instance within network fabric 120 defined by a Layer 3 routing domain and may provide both Layer 2 and Layer 3 services (using the VNID to provide both Layer 2 and Layer 3 segmentation). Micro-segmentation logically separates user or device groups within a virtual network, by enforcing source to destination access control permissions, such as by using access control lists (ACLs). A scalable group is a logical object identifier assigned to a group of users, devices, or things in network fabric 120. It may be used as source and destination classifiers in Security Group ACLs (SGACLs). The SGT may be used to provide address-agnostic group-based policies.

In some embodiments, fabric control plane nodes 110 may implement LISP for device communications and with management cloud 102. The control plane nodes may operate a HTDB, a map server, and a map resolver (e.g., as combined, a map server/map resolver "MS/MR"). The HTDB may track wireless endpoints 130B and 130E connected to network fabric 120 and associate the endpoints to fabric edge nodes 126B and 126E, thereby decoupling an endpoint's identifier (e.g., IP or MAC address) from its location (e.g., closest router) in the network. The LISP architecture and general operation is described in more detail later in relation to FIGS. 4A-4B.

Physical layer 184 may comprise various network devices, such as switches 133 and routers 135 (e.g., fabric control plane nodes 110, fabric border nodes 122A-122B, fabric intermediate nodes 124A-124D, and fabric edge nodes 126A-126F of FIG. 1A), wireless equipment 137 (e.g., wireless network infrastructure equipment 108, wireless base stations and APs 128A and 128B of FIG. 1A), network controller appliances 104, and AAA appliances 106, amongst others.

Shared services layer 190 may provide an interface to external network services, such as cloud services 192; Domain Name System (DNS), DHCP, IP Address Management (IPAM), and other network address management services 194; firewall services 196; Network as a Sensor (NaaS)/Encrypted Threat Analytics (ETA) services 198; and Virtual Network Functions (VNFs) 199; among others. Management layer 152 and/or controller layer 171 may share identity, policy, forwarding information, and so forth via shared services layer 190 using APIs.

Figure 2:
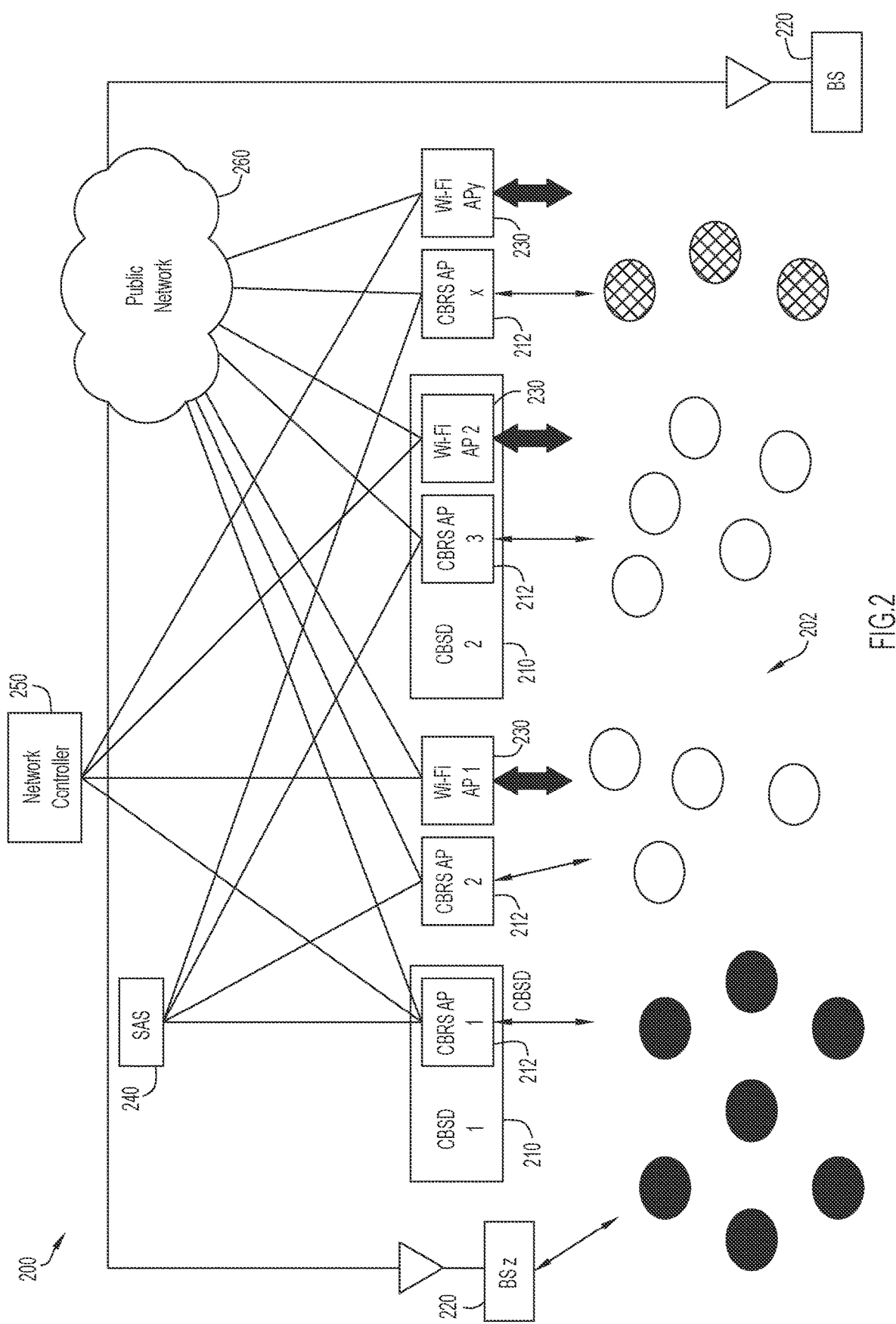
FIG. 2 illustrates one example of a wireless network environment in which at least some of the techniques and mechanisms of the present disclosure may be practiced.

FIG. 2 illustrates of one example of a wireless network 200, such as a network operative to provide a UE with network access. In this example, wireless network 200 may be a heterogeneous wireless network which may operate a UE with network access via a Wi-Fi network, cellular network, CBRS, and/or other radio network. As shown in this specific example, wireless network 200 includes UEs 202 (shown in various circles), CBRS Devices (CBSDs) 210 (e.g., CBSD1 and CBSD2), CBRS APs 212 (e.g., CBRS AP 1, 2, . . . , x), base stations (BSs) 220 (e.g., BS1, . . . , Bz) of a public radio network, "Wi-Fi" or wireless access points (APs) 230 (e.g., Wi-Fi AP1, 2, . . . , y), a Spectrum Access System (SAS) 240, a network controller 250, and a public IP network 260. Some of CBSDs 210 may include CBRS APs 212. CBSDs 210, BSs 220, and wireless APs 230 may connect UEs 202 to public IP network 260. Public IP network 260 may include a public data network, such as the Internet.

In FIG. 2, at least some of UEs 202 may be CBRS-enabled such that they may connect to public IP network 260 via a CBRS network. For example, UEs 202 may attach to a CBRS network comprising CBRS APs 212. Some of CBRS APs 212 may be standalone devices, such as CBRS AP 2 and CBRS AP x, while others may be integrated with other components and are part of another device such as is the case for the CBRS AP 1 and CBRS AP 3 in which the CBRS AP 1 is part of the CBSD 1 and CBRS AP 3 is part of the CBSD 2.

The CBSD 1 may also include a controller (not shown). A CBSD that includes a controller may be an evolved NodeB (eNodeB), defined in a Universal Mobile Telecommunications System (UMTS) standard. The CBSD 2 may be an integrated AP device that includes the CBRS AP 3 and also the wireless AP 2. SAS 240 may operate as a controller for CBSDs 210 and CBRS APs 212. SAS 240 may manage the CBRS spectrum and maintain a database of spectrum usage by all users, including Tier 1 users, Tier 2 users, and Tier 3 users (as shown in Table 1), in all census tracts or areas. SAS 240 may allocate channels to CBRS APs 212 using a variety of rules. For example, SAS 240 may consider multiple factors and inform CBRS APs 212 and CBSDs 210 of the operating parameters including allocated frequency band, allocated channel, and/or maximum effective isotropic radiated power that may be used at a given point in time. SAS 240 may also provide the Federal Communications Commission (FCC) required notification that an enterprise (e.g., a Tier 3 or Generally Authorized Access "GAA" user) needs to offload its UEs 202 from the CBRS network.

When the enterprise is forced to offload its UEs 202, they may be offloaded to a cellular network provided via BSs 220 or to a Wi-Fi network provided via wireless APs 230. In FIG. 2, based on a notification provided by SAS 240 to the CBSD 1, a set of UEs 202 attached to the CBRS AP 1 (e.g., shaded circles) may be offloaded from the CBRS AP 1 to the BSz, as an example. UEs 202 may continue to obtain access to public IP network 260 via the BSz and are offloaded from the CBRS network. According to some implementations, another set of UEs 202 (e.g., cross hatched circles) may be offloaded to a wireless network provided via the Wi-Fi AP y.

Wireless APs 230 may be managed and controlled by network controller 250. Network controller 250 may include a WLC. In one example embodiment, network controller 250 may also include an interworking function (IWK) to manage CBRS APs 212 or operate as a controller for at least some of CBRS APs 212. Network controller 250 may generate policies and push the policies to various access points for execution. For example, network controller 250 may run analytics to develop CBRS offloading policies. It is also possible, however, some or all of the functions of network controller 250 may be implemented within one or more of CBSDs 210 or CBRS APs 212.

Figure 3B:
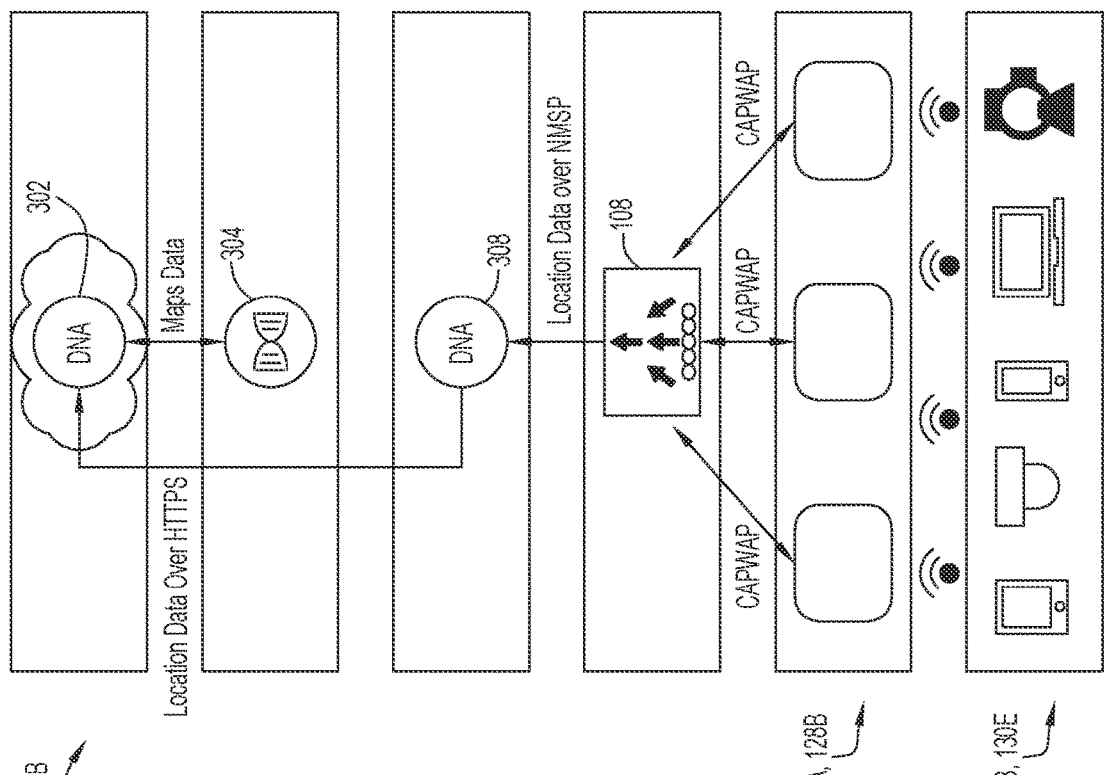
FIGS. 3A and 3B are illustrative diagrams of the enterprise network which includes a network infrastructure for communication with a cloud server configured to provide location identification and analysis services.
Figure 3A:
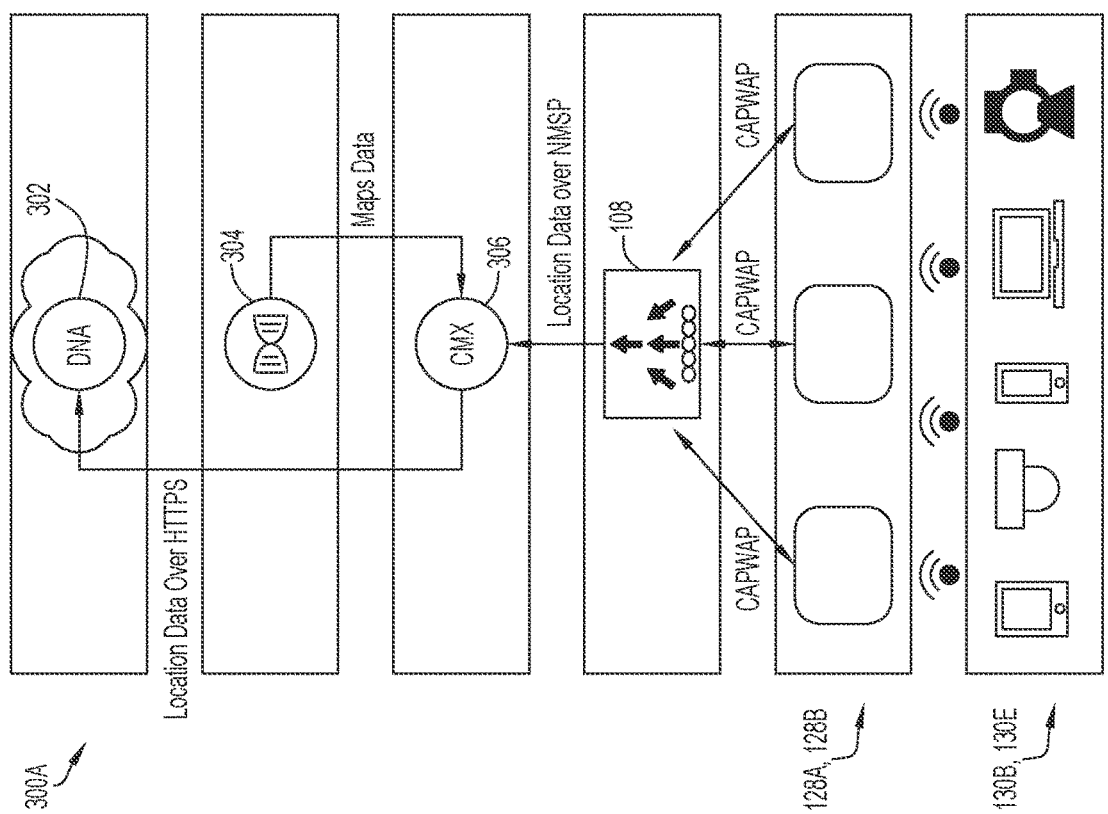

In some implementations, location identification and analysis services may be provided for use in the network. FIGS. 3A and 3B are illustrative diagrams of an enterprise network which includes a network infrastructure configuration 300A or 300B, respectively, for communication with a cloud server 302 (indicated as "DNA") configured to provide location identification and analysis services. In some implementations, cloud server 302 is a part of Cisco DNA Spaces™ which implement such services.

In general, cloud server 302 may receive telemetry data from wireless network infrastructure equipment 108 (e.g., the WLC). The telemetry data may include wireless telemetry data, including signal strength information of wireless APs, wireless endpoints, etc. (e.g., FIGS. 1A, 1B, and 2). A maps data server 304 may provide maps data for integration with data from detect and locate services. In FIG. 3A, a connector 306 (indicated as Connected Mobile Experience or "CMX") may be utilized to receive location data (via a Network Mobility Services Protocol or "NMSP") from wireless network infrastructure equipment 108, integrate these data with the maps data (FIG. 3A), and provide communications to cloud server 302. Alternatively, in FIG. 3B, a connector 308 (indicated as "DNA") may be utilized to receive the location data (via the NMSP) from wireless network infrastructure equipment 108 and provide communications to cloud server 302 for integration with the maps data. Cloud server 302 may provide various location identification and analysis services, including a detect and locate services (e.g., Received Signal Strength Indicator "RSSI" or more advanced), integrating with enterprise software to correlate the same with location data.

In some implementations, cloud server 302 may be operative to perform a wireless telemetry process according to the present disclosure, where cloud server 302 receives telemetry data from one or more WLCs. In other implementations, an WLC may be operative to perform the wireless telemetry process according to the present disclosure.

As described above, in some implementations, the fabric control plane may implement LISP for logically mapping and resolving users, devices, and things. Here, the routers create and maintain multiple Virtual Private Network (VPN) instances comprising forwarding tables for the routing of user plane traffic associated with different VPNs. Network virtualization creates multiple, logically-separated topologies across one common physical infrastructure. Network reachability within a VPN is typically restricted to the addresses of the endpoints that are members of the VPN. Such a level of segmentation is useful in providing fault isolation, enforcing access-control restrictions, enabling the use of a single network by multiple tenants, and scoping network policy per VPN. Protocols associated with these technologies are described in various published documents, including *The Locator/ID Separation Protocol (LISP)*, Internet Engineering Task Force (IETF), Request for Comments (RFC): 6830; D. Farinacci et al., January 2013. Note that protocols other than LISP may be utilized in other implementations, such as Border Gateway Protocol (BGP) Ethernet VPN (EVPN) (BGP-EVPN), VXLAN, Enhanced VLAN (EVLAN), or Identifier Locator Addressing (ILA).

LISP is a network architecture and protocol that uses multiple namespaces or network addresses for identifying and locating network nodes, such as an identity namespace or address space and a location namespace or address space. This is distinguishable from a conventional network that may only use a single namespace or address space (e.g., IP addresses) for both identifying and locating network nodes. LISP may assign addresses in the identity namespace (e.g., Endpoint Identifier or "EID" namespace) to hosts, and addresses in the location name space (e.g., Routing Locator or "RLOC" namespace) to network devices. LISP may maintain a directory of identifiers and their corresponding locations (e.g., a directory mapping of the EID namespace to the RLOC namespace). LISP, as a protocol, may define the signaling to populate this directory, keep it updated, and enable network devices to consult the directory and resolve the locations of EIDs of interest. Routing and forwarding of data packets may continue to be the responsibility of traditional routing protocols in the RLOC namespace but LISP may augment these protocols by adding another namespace to enable functionality that may otherwise be difficult to achieve natively in traditional routing protocols. Because of the separation of the namespaces and their loose coupling with basic routing and forwarding, the definition of EIDs and RLOCs may extend beyond addressing to include policy semantics and other metadata to provide features such as host mobility, large-scale segmentation, traffic engineering, location-aware policies, location tracking services, and so forth. A WAN platform that may integrate LISP (or similar technology for separating host identifier information and host location information) across multiple LANs may take further advantage of the decoupling of host identity and location.

Again, LISP may provide two namespaces: an EID namespace and a RLOC namespace. A host (e.g., which may be or be referred to as a wireless endpoint, such as a UE, a computer, a tablet, etc.) may be associated with an EID (e.g., an IP address), whereas a router may be associated with an RLOC (e.g., an IP address). A router may be an Ingress Tunnel Router (ITR), an egress tunnel router (ETR), or a combination thereof (ITR+ETR=xTR). A LISP Mapping System (e.g., including a mapping server and/or database) maps EIDs to RLOCs. Either the EID space, the RLOC space, or both, may be segmented. The LISP Mapping System may be used to map a segmented EID address space to the RLOC space. When the EID namespace is segmented, a LISP Instance-ID (IID) is encoded in both the data plane and the control plane to provide segmentation as well as to disambiguate overlapping EID Prefixes. This allows multiple VRFs to share a common routing locator network while maintaining EID prefix segmentation.

In a LISP VPN, xTRs that are members of the VPN should be configured with a forwarding context (e.g., a VRF) and the associated IID for the VPN. According to this configuration, the ETRs must register the EIDs within the forwarding context as Extended EIDs (IID+EID). The LISP mapping system consolidates the registrations from all the ETRs in the VPN and builds a mapping database for the VPN. ITRs that are members of the VPN will do forwarding lookups in the forwarding context where traffic was received. Upon a cache miss within the forwarding context, the ITR will issue a Map-Request for the destination EID and include the VPN's IID. This information will be encoded as an Extended EID (IID+EID) in the Map-Request issued. The IID to associate with the EID in this Map-request is derived from the configuration of the VPN's forwarding context (in which the traffic was received). The Mapping System should reply to the Map Request with a Mapping for the Extended EID (IID+EID), the IID of the Extended EID should be used to identify the forwarding context in which the Mapping received should be cached. Once a mapping has been cached in the VPN's forwarding context, the ITR may encapsulate the traffic towards the RLOC in the mapping. The IID corresponding to the VPN's forwarding context must be included in the IID field of the data plane header. When the encapsulated traffic is received at the ETR, the encapsulation header is removed and the IID received in the header is used to identify the forwarding context to use to do a forwarding lookup for the decapsulated traffic.

Extranet VPN support may be provided with LISP. Typically, an extranet allows for communication across multiple VPNs, subject to policy constraints, in which each "subscriber" VPN may communicate with a "provider" VPN to access a shared service but be restricted from communicating with each other via the provider VPN. LISP specifically allows for distributed extranet VPN support. Here, as the extranets are not centralized but rather distributed to ITRs, there is no centralized point of failure. For extranet routes, an ITR may operate to encapsulate user plane traffic associated with the IID corresponding to the VPN connected to the ETR. Extranet routes may be installed at the ITR with the IID corresponding to the destination VPN.

Figure 4A:
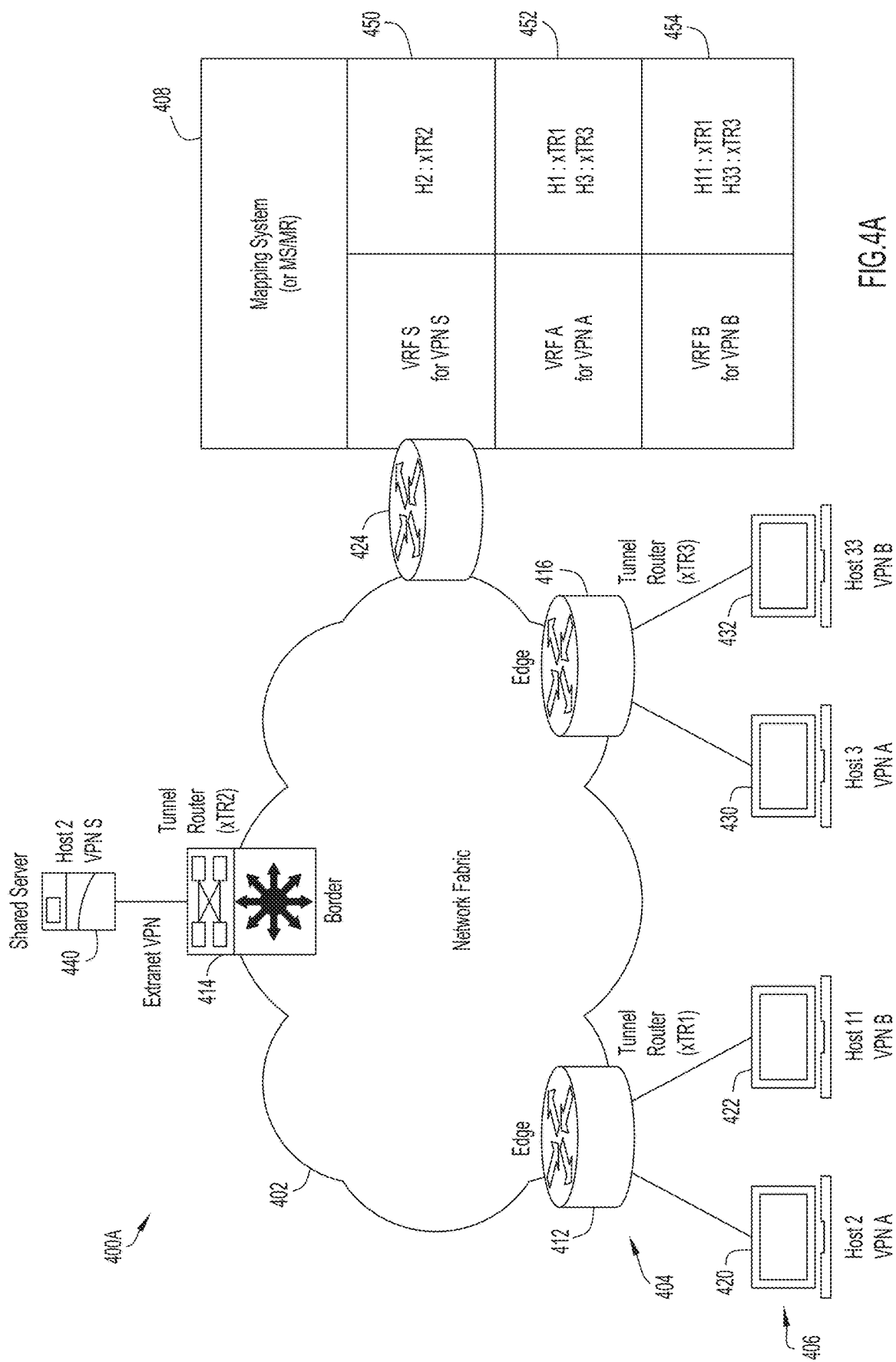
FIGS. 4A and 4B are illustrative representations of a network infrastructure arrangement of a network fabric, where each one of a plurality of routers ("tunnel routers") may be configured to process communications in accordance with a tunneling protocol to provide network overlay tunnels in the network fabric to facilitate virtual private (VPNs) for hosts, where the tunneling protocol is Locator/ID Separation Protocol (LISP) and a mapping system (or a map server/map resolver or "MS/MR") may be used for storing and providing host-to-router mappings for the communications.

To better further the overlay protocol (i.e., LISP), FIG. 4A is an illustrative representation of a network infrastructure arrangement 400A in one or more networks of a network fabric 402, wherein tunneling protocols are utilized to establish and maintain network overlay tunnels to provide VPNs. Network fabric 402 of FIG. 4A may be or be part of the same network fabric as that shown and described above (e.g., network fabric 120 of FIG. 1A), but with a specific focus on the overlay protocol (i.e., LISP).

In FIG. 4A, network fabric 402 is shown to include a plurality of routers 404. The plurality of routers 404 may be and/or be referred to as tunnel routers, each of which may be configured to perform a network overlay or "tunneling" protocol for establishing and maintaining network overlays or tunnels across the one or more networks of network fabric 402. The plurality of routers 404 illustrated in FIG. 4A include a tunnel router 412, a tunnel router 414, and a tunnel router 416. Tunnel routers 412 and 416 may be referred to as tunnel endpoints or "edge" tunnel routers, whereas tunnel router 414 may be referred to as a "border" tunnel router.

A plurality of hosts 406 may be connected in the one or more networks of network fabric 402. The plurality of hosts 406 illustrated in FIG. 4A include a host 420 ("host 1" or H1) and a host 422 ("host 11" or H11) connected via tunnel router 412, a host 440 ("host 2" or H2) connected via tunnel router 414, and a host 430 ("host 3" or H3) and a host 432 ("host 33" or H33) connected via tunnel router 416. As indicated in FIG. 4A, hosts 420 and 430 are members of the same VPN, "VPN A" that is associated with VRF A. Similarly, hosts 422 and 432 are members of the same VPN, "VPN B" that is associated with VRF B. Host 440 may be a member of "VPN S" associated with VRF S. In some implementations, host 440 may be a shared server which is accessible to hosts 420, 422, 430, and 432 via VPN S, which may be a remote extranet VPN.

One or more mapping servers or systems (e.g., mapping system 408 at a router 424) may be connected in the one or more networks of network fabric 402. Hosts 406 and other entities may register with mapping system 408 to provide their (route/router) locations in the network, for example, in the form of host-to-router mappings. Mapping system 408 may be or include, for example, a MS/MR. Registrations of hosts 406 in mapping system 408 are indicated in FIG. 4A. More specifically, registrations associated with VPN A (VRF A) includes host-to-router mappings 452 between host 420 and tunnel router 412 (i.e., H1: xTR1) and between host 430 and tunnel router 416 (i.e., H3:xTR3); registrations associated with VPN B (VRF B) includes host-to-router mappings 454 between host 422 and tunnel router 412 (i.e., H11: xTR1) and between host 432 and tunnel router 416 (i.e., H33: xTR3); and a registration associated with VPN S (VRF S) includes a host-to-router mapping 450 between host 440 and tunnel router 414 (i.e., H2: xTR2).

Figure 4B:
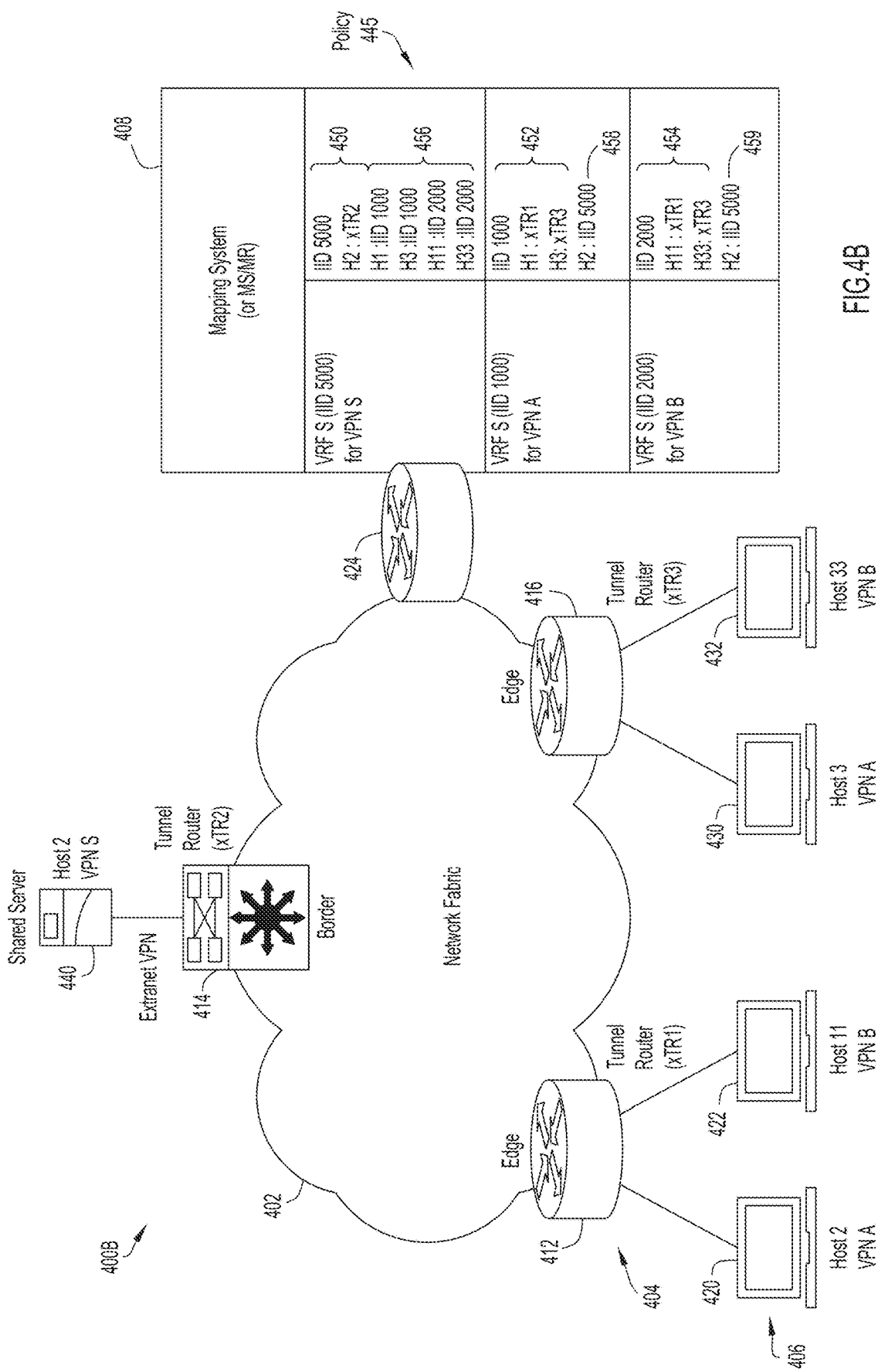

To further illustrate, FIG. 4B is an illustrative representation of a network infrastructure arrangement 400B which is the same as network infrastructure arrangement 400A of FIG. 4A, but further includes policy data 445 of a communication policy to further facilitate communications. Policy data 445 may be or include cross-VRF communication policy. In FIG. 4B, the same registrations of hosts 406 as well as their host-to-router mappings in mapping system 408 of FIG. 4A are indicated. More particularly, hosts 420 and 430 are members of the same VPN, which is VPN A associated with VRF A and an Instance ID (IID) of 1000; an extranet policy 458 for VPN A allows communication with host 440 associated with IID of 5000 (H2: IID 5000). Hosts 422 and 432 are members of the same VPN, which is VPN B associated with VRF B and an IID of 2000; an extranet policy 459 for VPN B allows communication with host 440 associated IID of 5000 (H2: IID 5000). On the other hand, host 440 may be a member of VPN S associated with VRF S and an IID of 5000; an extranet policy 456 for VPN S allows communication with hosts 420 and 430 associated with IID of 1000 (H1: IID 1000; H3: IID 1000) and hosts 422 and 432 associated with IID of 2000 (H11: IID 2000; H33: IID 2000).

Note that what is shown in FIG. 4B is merely an illustrative example using a single table with host entries pointing to extranet IIDs. In another illustrative example, a more efficient implementation may be provided using a separate policy table and iterative look-ups. In such an implementation, what may be used is a first table of the mappings of FIG. 4A (e.g., a mapping database) together with the inclusion of IIDs and a second table which simply indicates the communication policy (e.g., a policy database) in order to provide the system with sufficient information to perform look-ups across the VRFs. Other variations are possible as well.

As described earlier in the Background section, mobility in wireless network deployments should be seamless. Today, there is much work being done to optimize the wireless stack to achieve a fast handoff of wireless endpoints between wireless APs. In environments in which the data path for wireless communications is provided by the supporting wired network, fast convergence is also required in the wired network. Ideally, the wired network should pre-converge and eliminate any wired network convergence delay that may impact the speed of roaming for the wireless endpoint.

According to the present disclosure, what are proposed are techniques and mechanisms by which a wired infrastructure may converge ahead of a "move" by a host or wireless endpoint and substantially reduce or eliminate any packet loss due to wired convergence.

As a wireless endpoint roams from one wireless AP to another, the wireless network infrastructure is aware of changes in telemetry data associated with the roaming wireless endpoint. For example, different wireless APs may report signal levels that reflect (the changes in) the relative position or movement of the wireless endpoint. The signal levels may be read to detect (e.g., in all likelihood) that the wireless endpoint is moving from its current wireless AP to one of a set of handoff candidate wireless APs. The set of handoff candidate wireless APs may be, for example, those APs with signal level readings above the threshold.

According to the present disclosure, connectivity gaps caused by wired network convergence during mobility events may be eliminated by proactively replicating traffic to the different parts of the topology where the wireless endpoint may attach to next. The telemetry data may be used to optimize the system and decide when, as well as where, to replicate the traffic.

When a wireless infrastructure is designed to handoff its data traffic to the wired network (e.g., in a Wireless FLEX mode), it is desirable that the wired network re-converge when the wireless endpoint moves from one wireless AP to another wireless AP. Different wireless APs may be connected to different routers or switches in the wired network infrastructure. In a scenario where the wireless infrastructure is able to detect (or even predict) the set of handoff candidate wireless APs to which the wireless endpoint is going to move, the wired network infrastructure may pre-converge and start sending the traffic destined to the wireless endpoint to a set of routers that service a set of handoff candidate wireless APs of the wireless endpoint. This may be contrasted to sending traffic to only the single router that services the current wireless AP of the wireless endpoint. Replicated traffic may be discarded by any wireless APs that receives traffic destined to a wireless endpoint that is not associated with the wireless AP. Alternatively, in an optimized implementation, the traffic may be discarded by the router or switch in the wired infrastructure to offload the wireless APs.

As the move event is completed and the wireless endpoint associates with a new wireless AP, the telemetry data for the wireless AP will result in the calculation of a different set of handoff candidate wireless APs. In steady state (i.e., no mobility of the host), this set of handoff candidate wireless APs may include zero elements, in which case the traffic is not replicated.

In some implementations, the mechanism by which the traffic is replicated may be multiple, unicast copies of the same traffic. This conditional replication may be enabled in an overlay network by sending the replicated traffic in a tunnel header. In particular, the overlay network may be facilitated with use of LISP. By using such an overlay network, the original packet header can be preserved so that the destination can be reached, and the addresses for the routers to which the traffic is to be replicated can be imposed in the outer header. The router may send multiple copies to multiple unicast destinations to reach all the handoff candidate wireless APs in the set. In some implementations, the techniques and mechanisms of the present disclosure may be based on "*Signal-Free Locator/ID Separation Protocol (LISP) Multicast*" feature (described in Request For Comments "RFC" 8378) for achieving such replication.

Accordingly, in some implementations, a heuristic based on the use of LISP as an overlay routing protocol may be utilized in a wireless telemetry process (WTP). Below is one example of the wireless telemetry process:

1. The wireless telemetry process may aggregate telemetry from the different wireless APs for a particular host (e.g., a wireless endpoint), where each host is identified with an EID. In some implementations, the wireless telemetry process may reside in Cisco DNA Spaces or in a controller dedicated to wireless management (e.g., the WLC).

2. The different wireless APs may be registered with the map server, so that the map server contains the information about which routers the different wireless APs are connected to. The addresses for these routers are known as RLOCs.

3. The wireless telemetry process may be configured with a threshold used in determining if a set of handoff candidate wireless APs should be advertised to the map server to initiate the pre-convergence packet replication. In some implementations, the threshold may be calculated based on a ratio between the signal strength of the current wireless AP for the host and the signal strength for the same host on the wireless APs in the vicinity; similarly, thresholds may utilized to determine if a wireless AP may be a candidate for a particular endpoint.

4. If the threshold condition is met, the wireless telemetry process may communicate to the map server the set of handoff candidate wireless APs for the potentially roaming host. This may be communicated to the map server as an attribute of the EID of the roaming host.

5. The map server may select the set of RLOCs to which the set of handoff candidate wireless APs are connected. The set of RLOCs will determine which xTRs the traffic should be replicated to, and is registered in the map server as a replication list for the host's EID.

6. Any ITR subscribed to the roaming EID will be notified by LISP (e.g., a Map-Notify Message) of the new RLOC for the moving EID. Accordingly, in some implementations, a mapping notification or publish-subscribe mechanism may be utilized at the MS/MR. For example, notifications of mapping changes may be based on "*Publish/Subscribe Functionality for LISP*," LISP Working Group, Internet Draft, draft-ietf-lisp-pubsub-09, A. Rodriguez-Natal et al., Jun. 28, 2021. Thus, the RLOC may now be a replication list, so the ITR recognizes the need to replicate the traffic to the different RLOCs in the replication list.

7. When the host finally moves to a different wireless AP, the wired infrastructure would already be receiving traffic destined to the moving host at the new destination and, therefore, the network has pre-converged. Perhaps the only delays in completing the move may be in the re-convergence and re-association of the host to the wireless infrastructure.

Figure 5A:
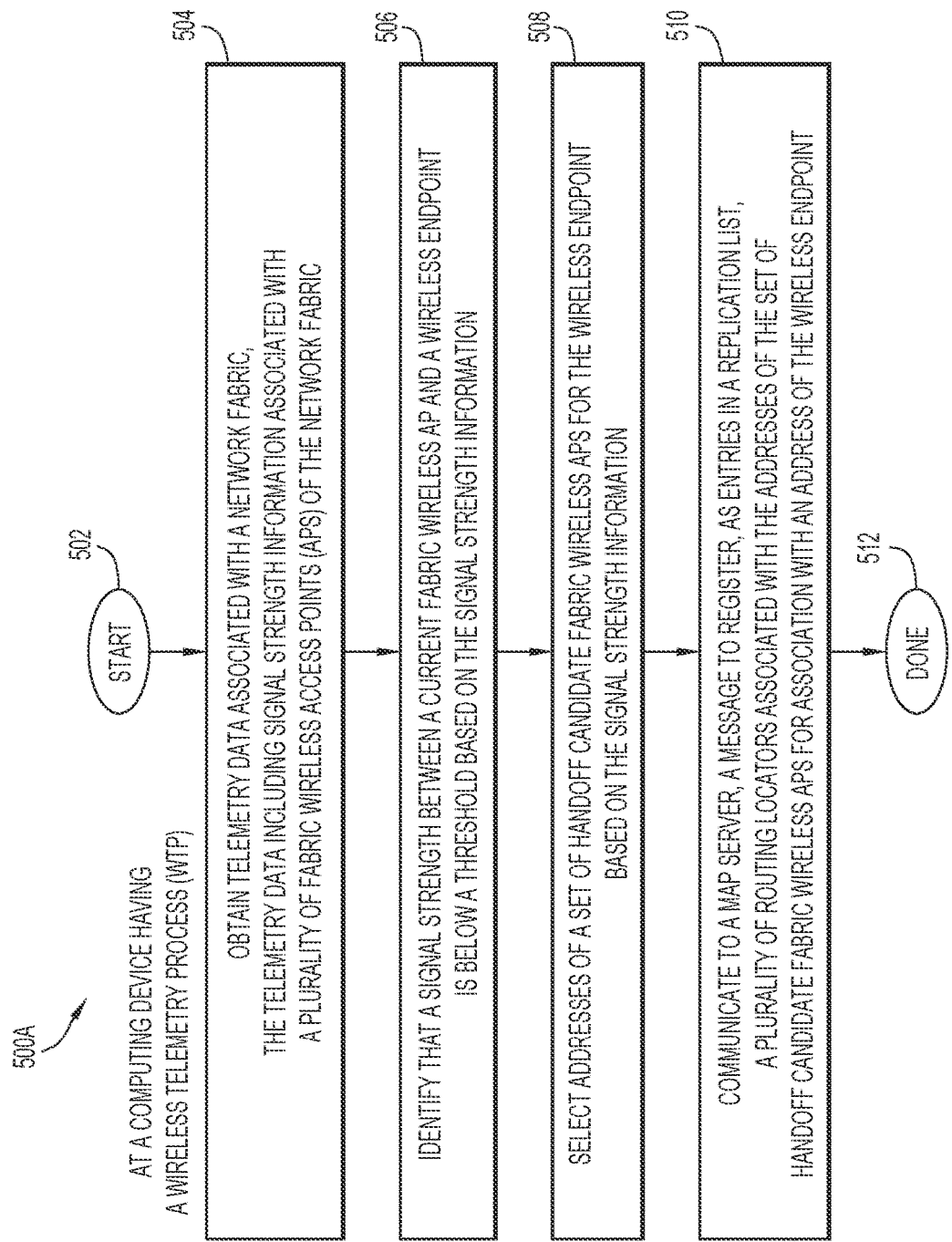
FIGS. 5A and 5B are flowcharts for describing methods for enabling a seamless handoff of a wireless endpoint between wireless APs in a network fabric with use of pre-convergence packet replication according to some implementations of the present disclosure, which may be performed at a computing device such as a wireless local area network (LAN) controller (WLC) or a cloud server configured to provide location identification and analysis services.

FIG. 5A is a flowchart 500A for describing a method for enabling a seamless handoff of a wireless endpoint between wireless APs in a network fabric with use of pre-convergence packet replication according to some implementations of the present disclosure. The method of FIG. 5A may be performed by a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements for operating as described. In some implementations, the computing device may be or be part of an WLC or a cloud server (e.g., which may be configured to provide location identification and analysis services). The method may be embodied as a computer program product including a non-transitory computer readable medium (e.g., one or more memory elements) and instructions stored in the computer readable medium, where the instructions are executable on one or more processors for performing the steps of the method. In some implementations, the instructions stored in the one or more memory elements may be executable on the one or more processors for operation as described herein.

Beginning at a start block 502 of FIG. 5A, the computing device may obtain telemetry data associated with a network fabric (step 504 of FIG. 5A). The telemetry data may include signal strength information associated with a plurality of fabric wireless APs of the network fabric. In some implementations, the telemetry data may be received at or from a WLC associated with the network fabric. The computing device may identify, based on the signal strength information, that a signal strength between a current fabric wireless AP and a wireless endpoint that is associated with the current fabric wireless AP is below a threshold (step 506 of FIG. 5A). Based on the identifying, the computing device may select addresses of a set of handoff candidate fabric wireless APs for the wireless endpoint based on the signal strength information (step 508 of FIG. 5A). The computing device may then communicate, to a map server, a message to register, as entries in a replication list, a plurality of routing locators associated with the addresses of the set of handoff candidate fabric wireless APs for association with an address of the wireless endpoint (step 510 of FIG. 5A). When a router (e.g. an ITR) in the network fabric receives notification of the replication list from the map server, the router may operate to replicate packets intended for the wireless endpoint to a plurality of routers (e.g. ETRs) that are connected to the set of handoff candidate fabric wireless APs (e.g., perform unicast replication). In some implementations, a mapping notification or publish-subscribe mechanism may be utilized for the notification. The flowchart 500A is then done at a done block 512 of FIG. 5A.

Figure 5B:
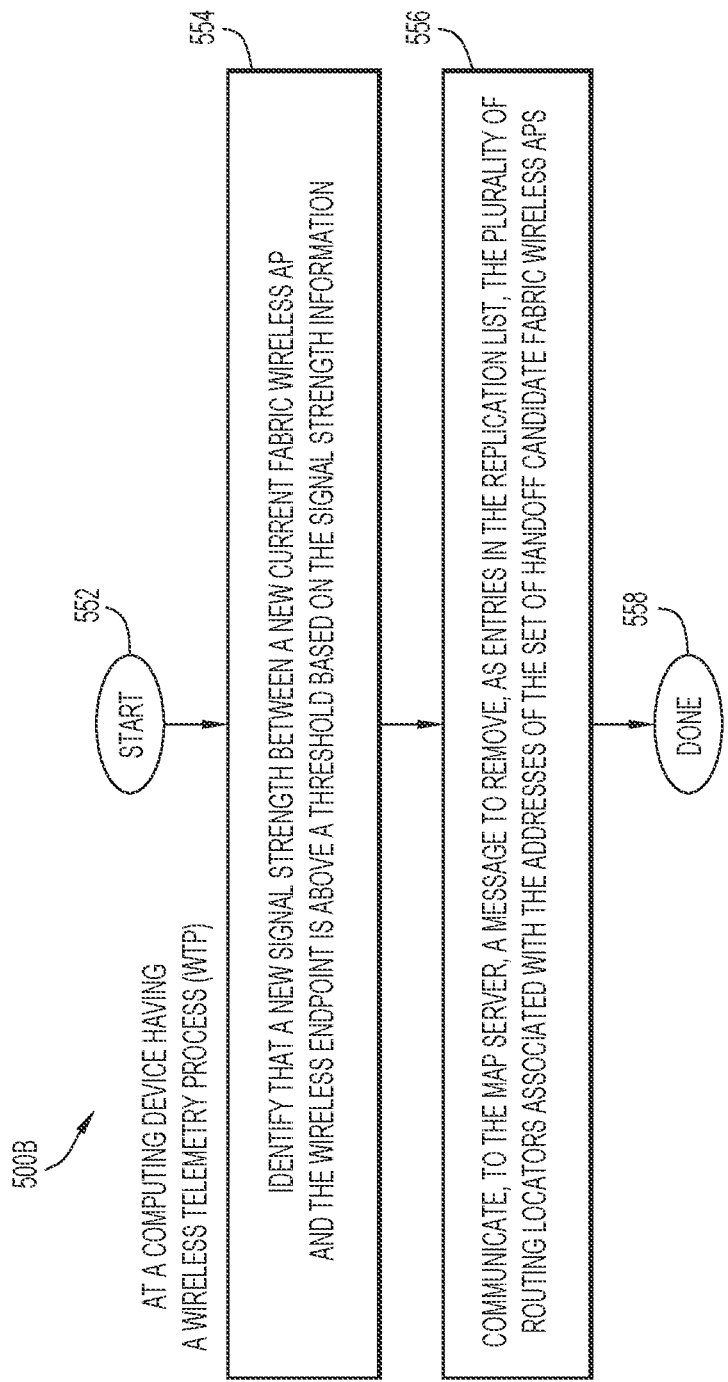

FIG. 5B is a flowchart 500B for describing a method for enabling a seamless handoff of a wireless endpoint between wireless APs in a network fabric with use of pre-convergence packet replication according to some implementations of the present disclosure. The method of FIG. 5B may be performed by the computing device or the network node configured to connect in the network for communication. The method of FIG. 5B may follow the method of FIG. 5A previously described.

Beginning at a start block 552 of FIG. 5B, the computing device may identify, based on the signal strength information, that a new signal strength between a new current fabric wireless AP and the wireless endpoint is above a threshold (step 554 of FIG. 5B). The new current fabric wireless AP may be one with which the wireless endpoint is newly-associated. In alternative implementations, step 554 may involve identifying a new association between the wireless endpoint and the new current fabric wireless AP. Based on the identifying in step 554, the computing device may communicate, to the map server, a message to remove, as entries in the replication list, the plurality of routing locators associated with the addresses of the set of handoff candidate fabric wireless APs (step 556 of FIG. 5B). When the router (e.g. the ITR) in the network fabric receives notification of the removal of the replication list from the map server, the router may operate to cease the replication of the packets intended for the wireless endpoint to the plurality of routers (e.g. the ETRs) that are connected to the set of handoff candidate fabric wireless APs (e.g., replication that was initially caused in response to step 510 of FIG. 5A). In some implementations, the mapping notification or publish-subscribe mechanism may be utilized for the notification. The flowchart 500B is then done at a done block 558 of FIG. 5B.

Figure 6A:
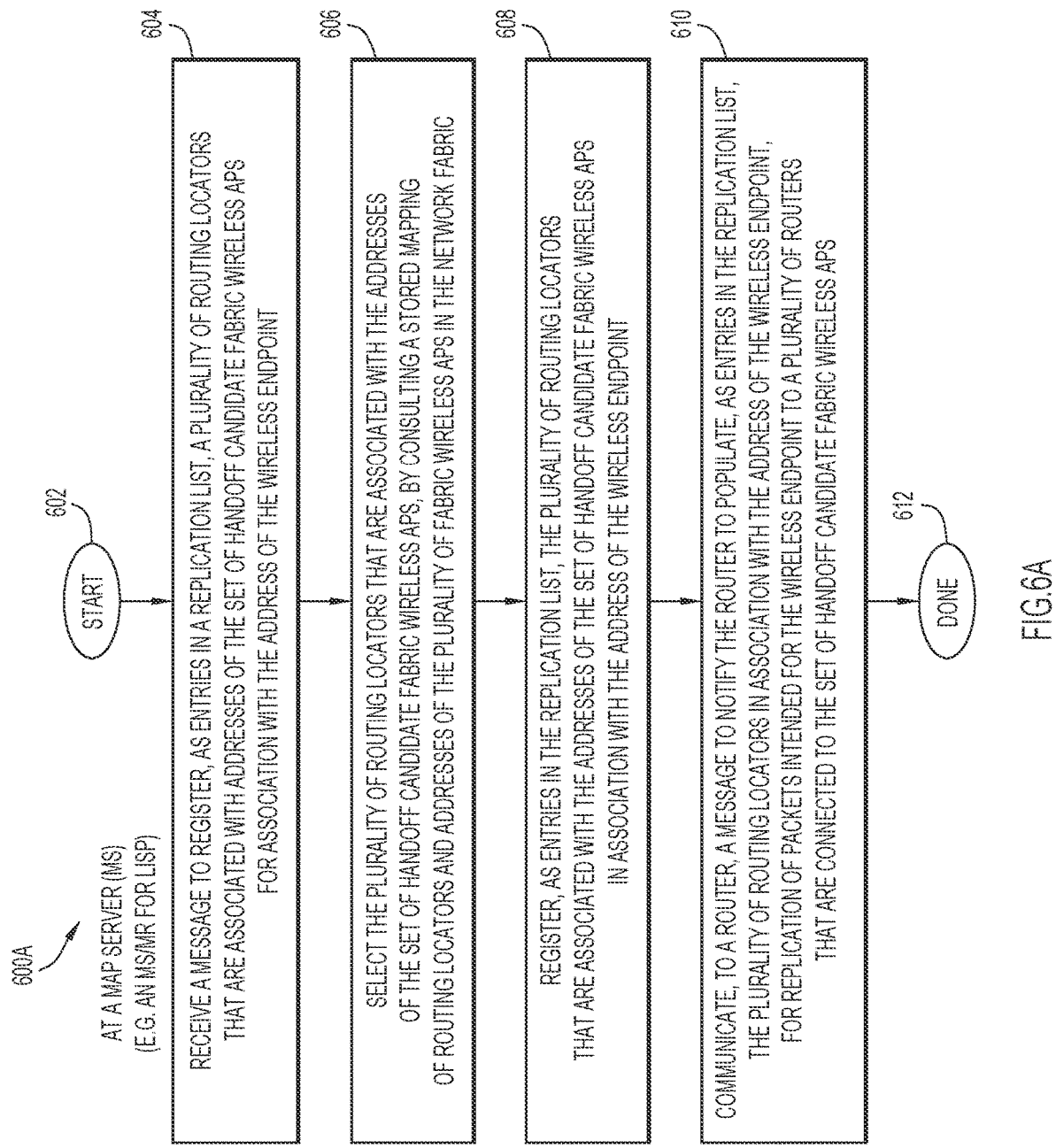
FIGS. 6A and 6B are flowcharts for describing methods for enabling a seamless handoff of a wireless endpoint between wireless APs in a network fabric with use of pre-convergence packet replication according to some implementations of the present disclosure, which may be performed at a computing device such as a map server (or a MS/MR for LISP)

FIG. 6A is a flowchart 600A for describing a method for enabling a seamless handoff of a wireless endpoint between wireless APs in a network fabric with use of pre-convergence packet replication according to some implementations of the present disclosure. The method of FIG. 6A may be performed by a computing device or a network node configured to connect in a network for communication. In some implementations, the computing device or network node may include at least one or more interfaces configured to connect to a network for communication, one or more processors, one or more memory elements coupled to the one or more processors, and instructions stored in the one or more memory elements for operating as described. In some implementations, the computing device may operate as a map server (or an MS/MR for LISP). The method may be embodied as a computer program product including a non-transitory computer readable medium (e.g., one or more memory elements) and instructions stored in the computer readable medium, where the instructions are executable on one or more processors for performing the steps of the method. In some implementations, the instructions stored in the one or more memory elements may be executable on the one or more processors for operation as described herein.

Beginning at a start block 602 of FIG. 6A, the computing device may receive a message to register, as entries in a replication list, a plurality of routing locators associated with the addresses of the set of handoff candidate fabric wireless APs for association with the address of the wireless endpoint (step 604 of FIG. 6A). The message may include the addresses of the set of handoff candidate fabric wireless APs. The computing device may select a plurality of routing locators associated with the addresses of the set of handoff candidate fabric wireless APs, based on (e.g., by consulting) a stored mapping of routing locators and addresses of the plurality of fabric wireless APs in the network fabric (step 606 of FIG. 6A). The computing device may register, as entries in the replication list, the plurality of routing locators associated with the addresses of the set of handoff candidate fabric wireless APs, in association with the address of the wireless endpoint (step 608 of FIG. 6A). The computing device may communicate, to a router (e.g. an ITR), a message to notify the router to populate, as entries in the replication list, the plurality of routing locators in association with the address of the wireless endpoint (step 610 of FIG. 6A). In some implementations, a mapping notification or publish-subscribe mechanism may be utilized for the notification. Once populated with the replication list, the router (e.g. the ITR) may operate to replicate packets intended for the wireless endpoint to a plurality of routers (e.g. ETRs) that are connected to the set of handoff candidate fabric wireless APs (e.g., perform unicast replication). The flowchart 600A is then done at a done block 612 of FIG. 6A.

Figure 6B:
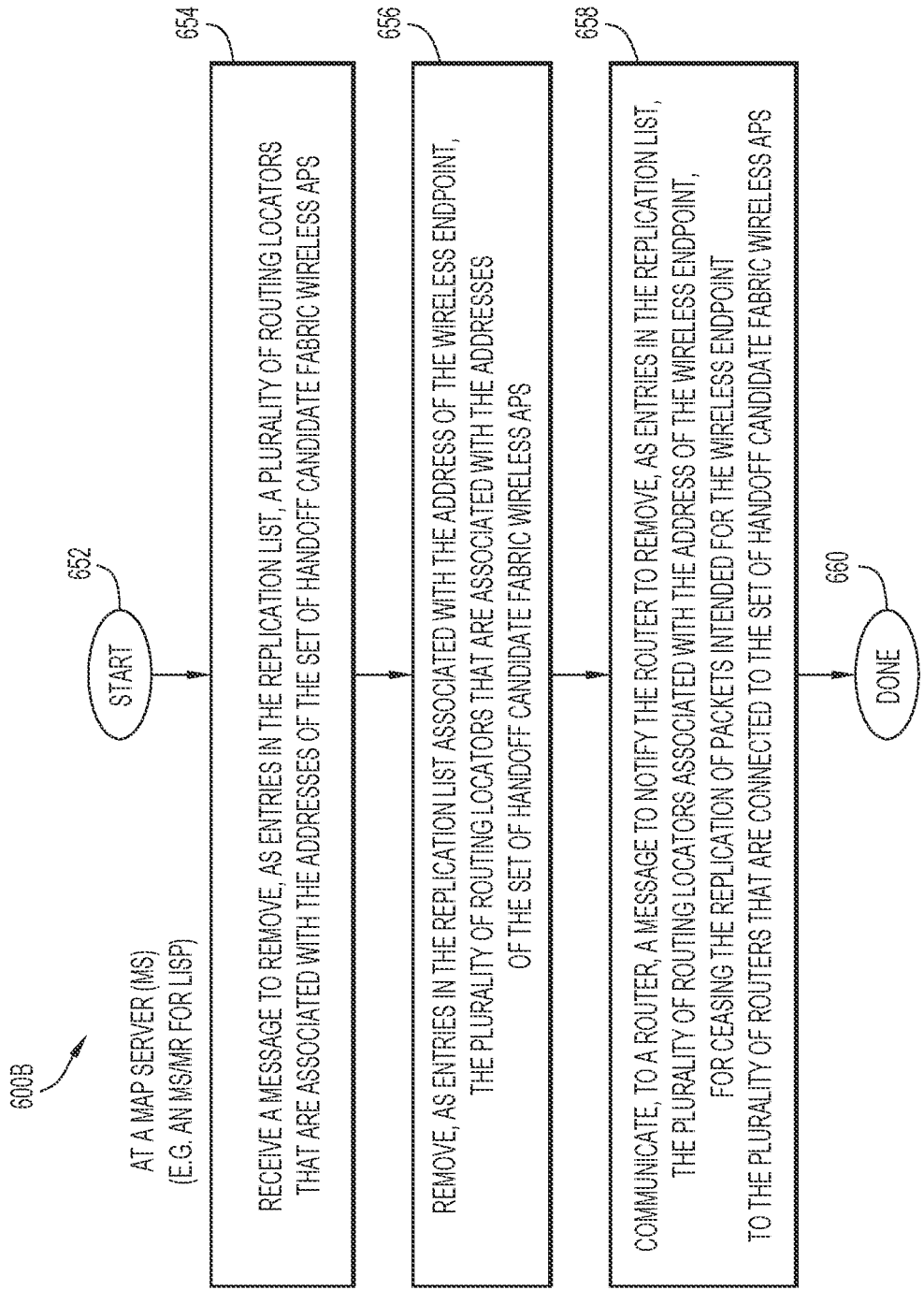

FIG. 6B is a flowchart 600A for describing a method for enabling a seamless handoff of a wireless endpoint between wireless APs in a network fabric with use of pre-convergence packet replication according to some implementations of the present disclosure. The method of FIG. 6B may be performed by the computing device or the network node (e.g., operating as a map server or an MS/MR for LISP) configured to connect in the network for communication. The method of FIG. 6B may follow the method of FIG. 6A previously described.

Beginning at a start block 652 of FIG. 6B, the computing device may receive a message to remove, as entries in a replication list, a plurality of routing locators that are associated with the addresses of the set of handoff candidate fabric wireless APs (step 654 of FIG. 6B). The computing device may remove, as entries in the replication list associated with the address of the wireless endpoint, the plurality of routing locators that are associated with the addresses of the set of handoff candidate fabric wireless APs (step 656 of FIG. 6B). The computing device may communicate, to a router (e.g. the ITR), a message to notify the router to remove, as entries in the replication list, the plurality of routing locators associated with the address of the wireless endpoint (step 658 of FIG. 6B). Again, in some implementations, the mapping notification or publish-subscribe mechanism may be utilized for the notification. Once the replication list is removed, the router (e.g. the ITR) may operate to cease the replication of the packets intended for the wireless endpoint to the plurality of routers (e.g. the ETRs) that are connected to the set of handoff candidate fabric wireless APs. The flowchart 600B is then done at a done block 660 of FIG. 6B.

In some implementations, the techniques and mechanisms of FIGS. 5A-5B and 6A-B may be based on "*Signal-Free Locator/ID Separation Protocol (LISP) Multicast*" feature (e.g. Request For Comments "RFC" 8378) for achieving replication.

Figure 7:
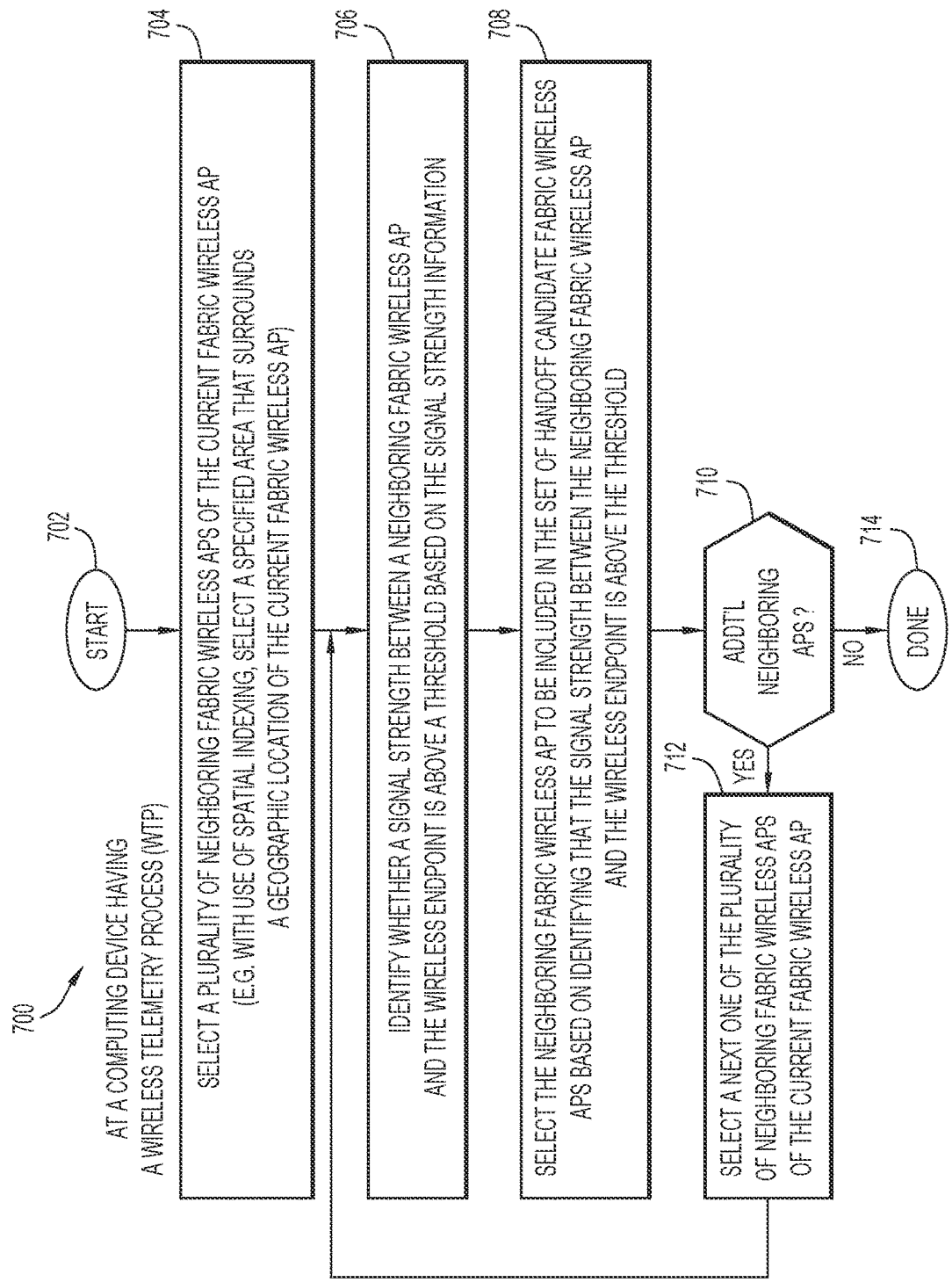
FIG. 7 is a flowchart for describing a method for enabling a seamless handoff of a wireless endpoint between wireless APs in a network fabric with use of pre-convergence packet replication according to some implementations of the present disclosure, which may be performed at the computing device such as the WLC or the cloud server configured to provide location identification and analysis services.

FIG. 7 is a flowchart 700 for describing a method for enabling a seamless handoff between wireless APs in a network fabric with use of pre-convergence packet replication according to some implementations of the present disclosure. The method of FIG. 7 may be performed at the computing device which is or is part of an WLC or a cloud server (e.g., which may be configured to provide location identification and analysis services). The method of FIG. 7 relates to a process for selecting the set of handoff candidate fabric wireless APs (e.g., or the addresses thereof) for the wireless endpoint based on the signal strength information, which may be associated with step 508 of FIG. 5A. In some implementations, the process may involve the processing of data associated with a plurality of fabric wireless APs in the network fabric, where the data are stored with a spatial indexing.

Beginning at a start block 702 of FIG. 7, the computing device may select a plurality of neighboring fabric wireless APs of the current fabric wireless AP (step 704 of FIG. 7). The computing device may identify whether a signal strength between one of the neighboring fabric wireless APs and the wireless endpoint is above a threshold based on the signal strength information (step 706 of FIG. 7). The computing device may select the neighboring fabric wireless AP to be included in the set of handoff candidate fabric wireless APs based on identifying that the signal strength between the neighboring fabric wireless AP and the wireless endpoint is above the threshold (step 708 of FIG. 7). The computing device may check to identify whether there are any additional neighboring fabric wireless APs to consider (step 710 of FIG. 7). If "yes" at step 710, then the computing device may proceed to select the next one of the plurality of neighboring fabric wireless APs (step 712 of FIG. 7) and repeat the processing at step 706 of FIG. 7. If "no" at step 710, the flowchart 700 is then done at a done block 714 of FIG. 7.

In some implementations, step 704 of FIG. 7 may involve the processing of data associated with the plurality of fabric wireless APs in the network fabric, where the data are stored with a spatial indexing. Here, the computing device may maintain access to the data which are stored with the spatial indexing, where the data may include identifiers of the APs, addresses of the APs, signal strength information of the APs, etc. More specifically in step 704 of FIG. 7, the computing device may select the plurality of neighboring fabric wireless APs by selecting, with use of the spatial indexing of the data, a specified area that surrounds a geographic location of the current fabric wireless AP.

According to the present disclosure, any suitable algorithm may be used to select or determine the set of handover candidate wireless APs. In some implementations, a very simple heuristic is utilized; however, more sophisticated schemes may also be utilized. The following is one example algorithm that may be utilized for making such a determination:

(a) obtain a signal-to-noise ratio (SNR) which is a measure of signal strength;
(b) organize a list of APs in cells, preferably with use of spatial indexing (e.g., cells having hexagon shapes);
(c) within a particular cell, identify a baseline SNR for the population of EIDs in steady state;
(d) monitor changes in SNR; if there is activity above a certain level of change (e.g., a roaming behavior), then monitor SNR changes in a covering macro-cell that includes the cell in which the activity was detected;
(e) identify an EID (or EIDs) that presents a roaming behavior;
(f) measure the SNR for the EID in its containing cell and macro-cell; this may determine the APs to examine for SNR;
(g) if the SNR for the EID on one or more of the neighbor APs is above a certain threshold, then calculate the cell (e.g., hexagon) that is centered around the midpoint between the current AP the EID is hosted at and the AP with the highest reading above the threshold; and
(h) all wireless APs in the calculated cell (e.g., hexagon) may be included as part of the set of handoff candidate wireless APs.

FIGS. 8A, 8B, 8C, and 8D are illustrative diagrams of top down views of a network fabric with a plurality of fabric wireless APs 850 according to some implementations of the present disclosure, showing sequential positional scenarios associated with a wireless endpoint 802 operating in the network fabric. Each one of the plurality of fabric wireless APs 850 in the network fabric may be contained in one of a plurality of geographic cells 870.

More particularly in FIGS. 8A-8D, fabric wireless APs 810A, 810B, 810C, 810D, 810E, 810F, and 810G are shown to be located within a geographic cell 810; fabric wireless APs 812A and 812B are located within a geographic cell 812; fabric wireless APs 814A and 814B are located within a geographic cell 814; fabric wireless APs 816A, 816B, and 816C are located within a geographic cell 816; and fabric wireless APs 818A, 818B, and 818C are located within a geographic cell 818. In some implementations, the plurality of geographic cells 870 (e.g., shown here as hexagon shapes) may represent the spatial indexing that may be utilized in relation to the plurality of fabric wireless APs 850. Note that only the fabric wireless APs of the network fabric that are relevant for discussion are shown in FIGS. 8A-8D; for example, the tunnel routers that are connected to the fabric wireless APs are not shown for figure clarity.

Figure 8A:
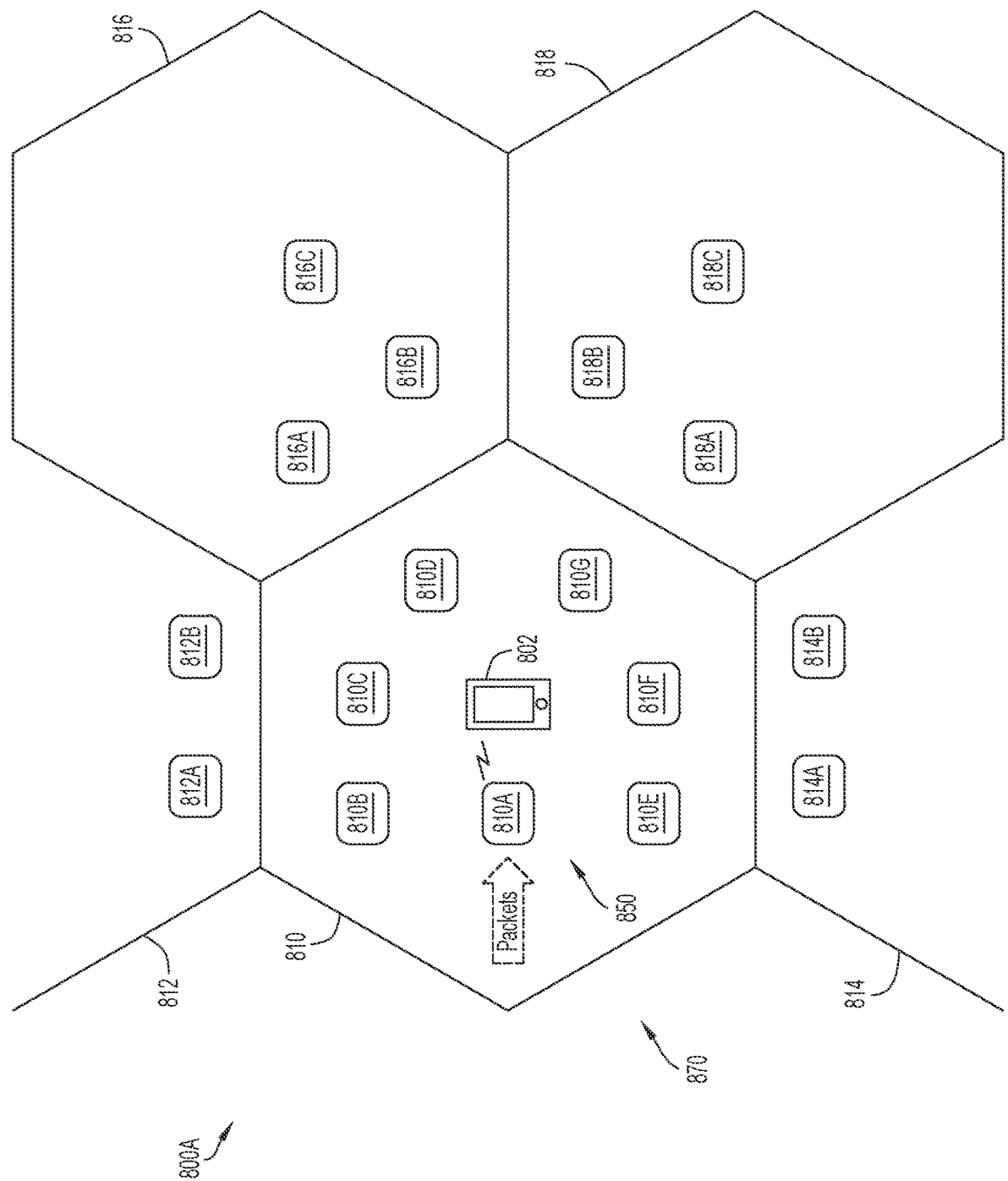
FIGS. 8A, 8B, 8C, and 8D are illustrative diagrams of top down views of a network fabric having a plurality of wireless APs configured according to some implementations of the present disclosure, showing sequential positioning scenarios associated with a wireless endpoint operating in the network fabric.

With reference a scenario 800A of FIG. 8A, wireless endpoint 802 is shown to be located within geographic cell 810 and associated with fabric wireless AP 810A. As indicated in FIG. 8A, fabric wireless AP 810A is receiving packets via the wired network and wirelessly transmitting these packets to wireless endpoint 802. The wireless telemetry process is regularly receiving telemetry data of the network fabric, and the telemetry data include signal strength information associated with at least some of the plurality of fabric wireless APs 850.

Figure 8B:
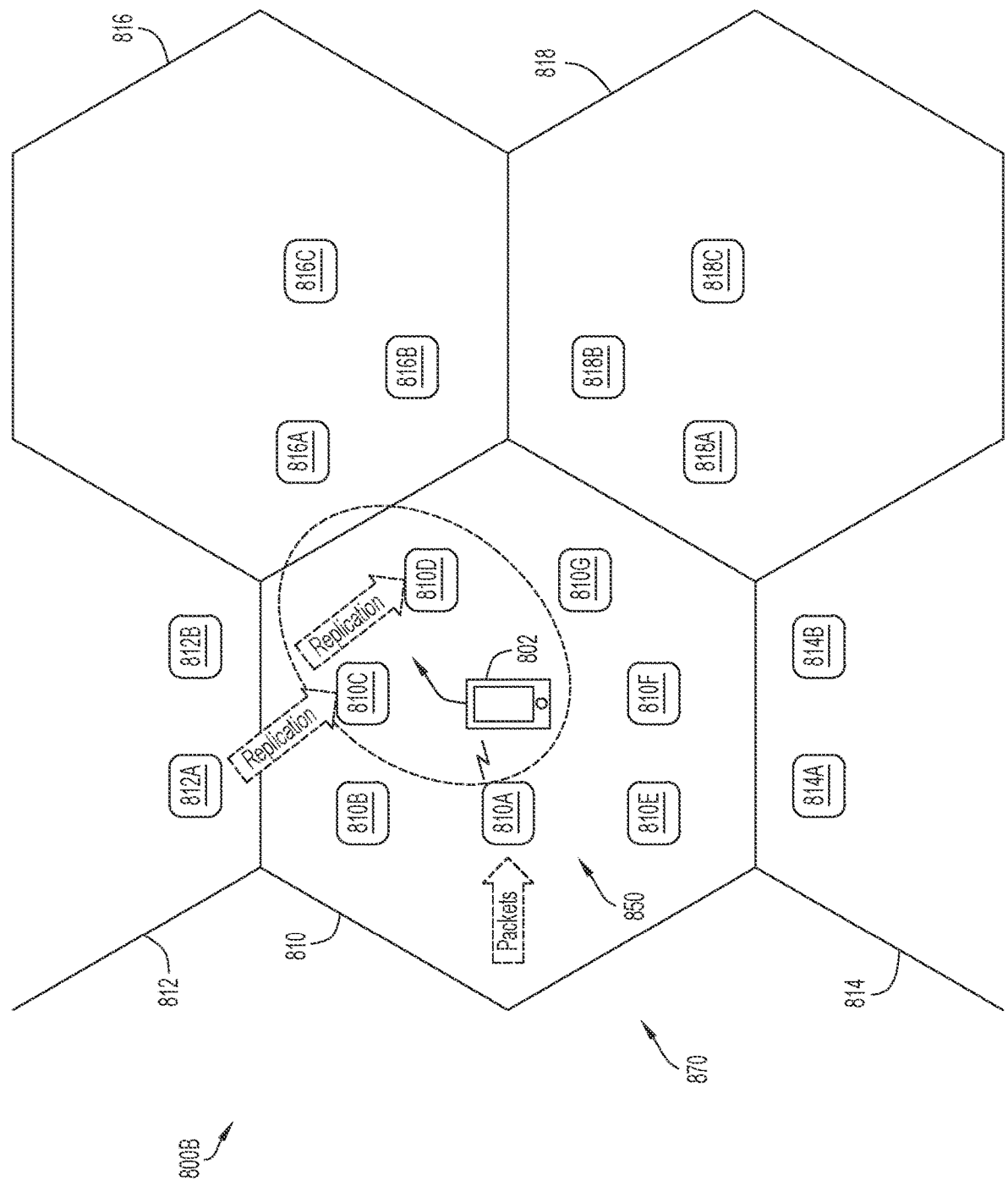

With reference to a scenario 800B of FIG. 8B, wireless endpoint 802 is shown to move within geographic cell 810, upwardly according to the arrow shown, and maintaining its association with fabric wireless AP 810A. As indicated in FIG. 8B, fabric wireless AP 810A is still receiving packets from the wired network and wirelessly transmitting these packets to wireless endpoint 802. However, the signal strength between fabric wireless AP 810A and wireless endpoint 802 is detected to be relatively weak based on the signal strength information, and this has triggered the wireless telemetry process for the (unicast) replication of packets (e.g., performance of methods of FIGS. 5A, 6A, and/or 7). More particularly, as the signal strength between each fabric wireless AP 810C and 810D and wireless endpoint 802 is detected to be relatively strong based on the signal strength information, the (unicast) replication of packets is directed to both fabric wireless APs 810C and 810D via the wired network. In some implementations, the initial set of neighboring wireless APs of fabric wireless AP 810A is selected with use of spatial indexing, to be those in geographic cell 810, which include fabric wireless APs 810A, 810B, 810C, 810D, 810E, 810F, and 810G (all others may be excluded from signal strength testing). As wireless endpoint 802 is not associated with fabric wireless APs 810C and 810D, however, these replicated packets will be dropped and not wirelessly transmitted from fabric wireless APs 810C and 810D.

Figure 8C:
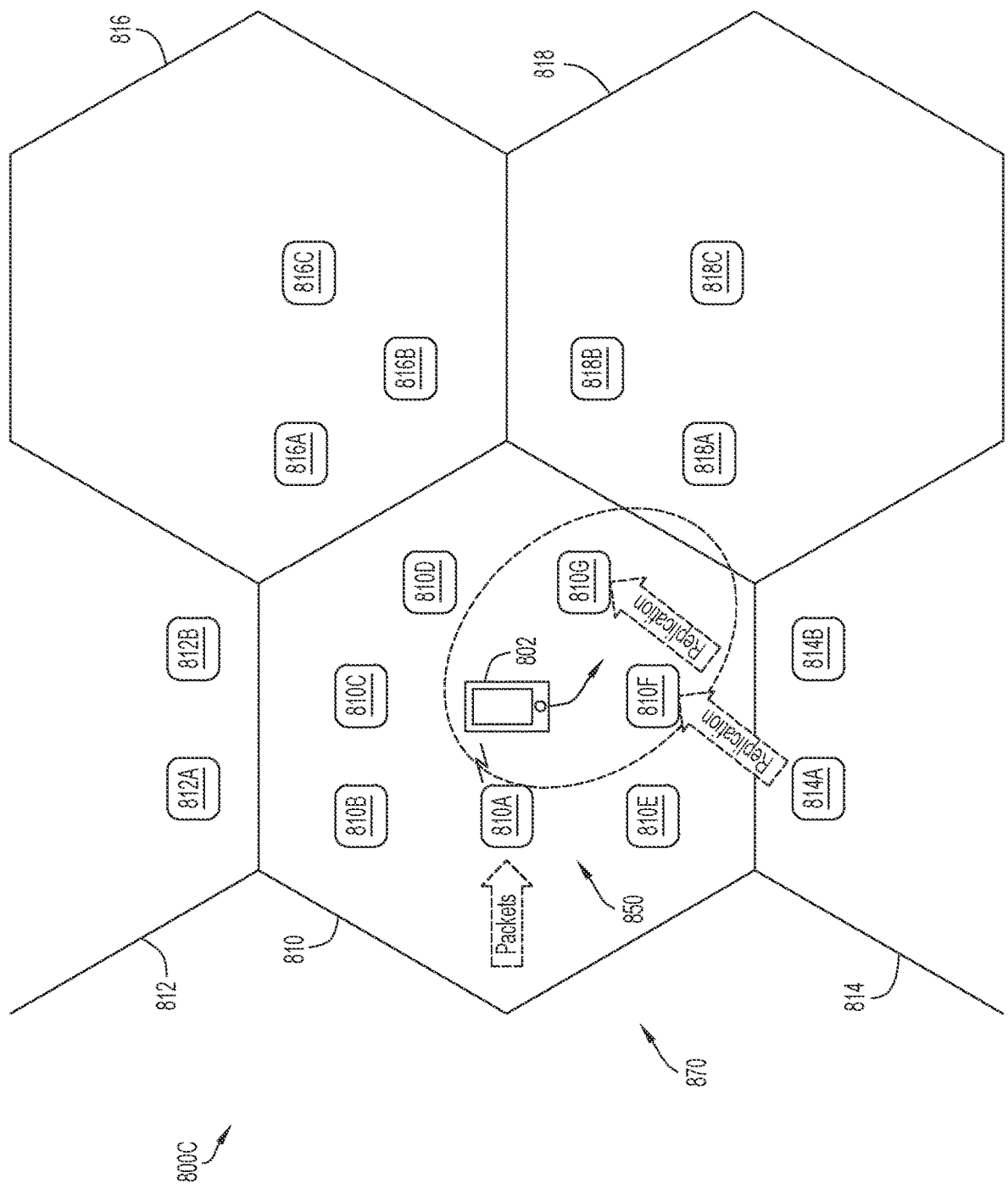

With reference to a scenario 800C of FIG. 8C, wireless endpoint 802 is then shown to (alternatively) move within geographic cell 810, downwardly according to the arrow shown, and still maintaining its association with fabric wireless AP 810A. As indicated in FIG. 8C, fabric wireless AP 810A is still receiving packets from the wired network and wirelessly transmitting these packets to wireless endpoint 802. Again, however, the signal strength between fabric wireless AP 810A and wireless endpoint 802 is detected to be relatively weak based on the signal strength information, and this has triggered the wireless telemetry process for the (unicast) replication of packets (e.g., performance of methods of FIGS. 5A, 6A, and/or 7). More particularly, as the signal strength between each fabric wireless AP 810F and 810G and wireless endpoint 802 is detected to be relatively strong based on the signal strength information, the (unicast) replication of packets is directed to both the fabric wireless APs 810F and 810G via the wired network. In some implementations, the initial set of neighboring wireless APs of fabric wireless AP 810A is selected with use of spatial indexing, to be those in geographic cell 810, which include fabric wireless APs 810A, 810B, 810C, 810D, 810E, 810F, and 810G (all others may be excluded from signal strength testing). As wireless endpoint 802 is not associated with fabric wireless APs 810F and 810G, however, these replicated packets will be dropped and not wirelessly transmitted from fabric wireless APs 810F and 810G.

Figure 8D:
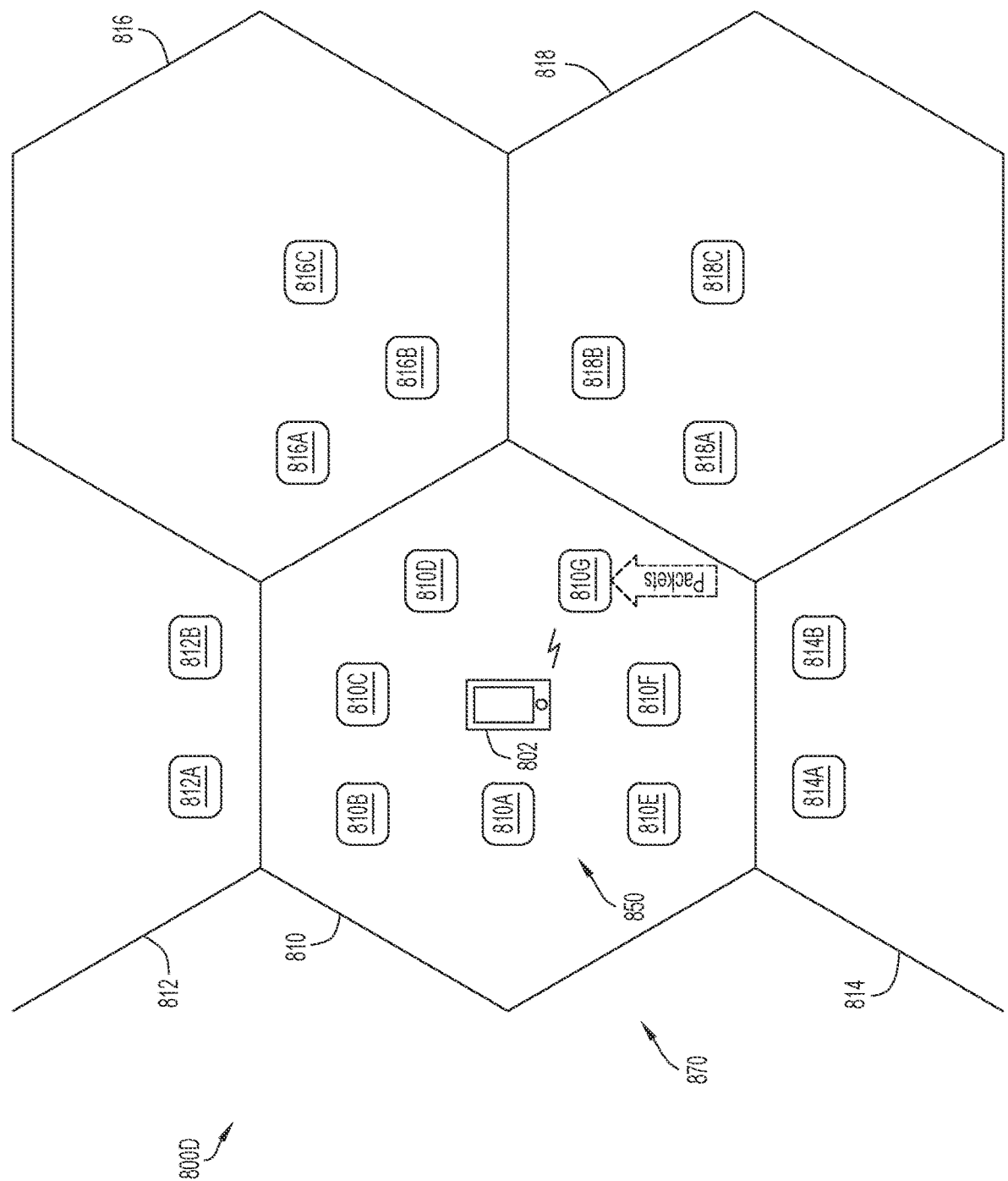

With reference to a scenario 800D of FIG. 8D, wireless endpoint 802 is then shown to again move within geographic cell 810 to the further position shown, such that it is no longer associated with fabric wireless AP 810A. The signal strength between fabric wireless AP 810A and wireless endpoint 802 is detected to be below a threshold based on the signal strength information. Accordingly, wireless endpoint 802 has been handed off to fabric wireless AP 810G with which it is now associated. As indicated in FIG. 8D, fabric wireless AP 810G is (still) receiving packets from the wired network (i.e., from the previous scenario of FIG. 8C) and now wirelessly transmitting these packets to wireless endpoint 802. The new signal strength between (newly-associated) fabric wireless AP 810G and wireless endpoint 802 is detected to be above another threshold based on the signal strength information. As the new signal strength between fabric wireless AP 810G and wireless endpoint 802 is detected to be relatively strong, this has triggered the wireless telemetry process to cease the replication of packets to any additional routers/APs (e.g., performance of methods of FIGS. 5B and/or 6B).

Thus, techniques and mechanisms for enabling a seamless handoff of a wireless endpoint between wireless APs in a network fabric with use of pre-convergence packet replication have been described. In one illustrative example, the method may involve obtaining telemetry data associated with a network fabric, the telemetry data including signal strength information associated with a plurality of fabric wireless APs of the network fabric; identifying that a signal strength between a current wireless AP and a wireless endpoint is below a threshold based on the signal strength information, and based on the identifying: selecting addresses of a set of handoff candidate wireless APs for the wireless endpoint based on the signal strength information; and communicating, to a map server, a message to register, as entries in a replication list, a plurality of routing locators associated with the addresses of the set of handoff candidate wireless APs for association with an address of the wireless endpoint.

In some implementations, the method may further involve receiving the telemetry data at or from a WLC associated with the network fabric. In some implementations, the map server comprises a MS/MR of a LISP control plane for use in the network fabric.

In some implementations, the method may further involve identifying that a new signal strength between a newly-associated current wireless AP and the wireless endpoint is above another threshold based on the signal strength information, and based on the identifying, communicating, to the map server, a message to remove, as entries in the replication list, the plurality of routing locators associated with the addresses of the set of handoff candidate wireless APs.

In some implementations, the selecting of the addresses of the set of handoff candidate wireless APs for the wireless endpoint based on the signal strength information further comprises selecting a plurality of neighboring wireless APs of the current wireless AP; and, for each one of the plurality of neighboring wireless APs of the current wireless AP: identifying whether a neighbor signal strength between a neighboring wireless AP and the wireless endpoint is above another threshold based on the signal strength information; and selecting the neighboring wireless AP to be included in the set of handoff candidate wireless APs based on identifying that the neighbor signal strength between the neighboring wireless AP and the wireless endpoint is above the other threshold. In further implementations, the method may involve maintaining access to data associated with the plurality of wireless APs in the network fabric, where the data are stored with a spatial indexing, and where the selecting of the plurality of neighboring wireless APs further comprises selecting, with use of the spatial indexing of the data, a specified area that surrounds a geographic location of the current wireless AP.

In some implementations, the method may involve the performance of additional steps at the map server, which involve receiving the message to register, as entries in the replication list, the plurality of routing locators associated with the addresses of the set of handoff candidate wireless APs for association with the address of the wireless endpoint; selecting the plurality of routing locators associated with the addresses of the set of handoff candidate wireless APs, based on a stored mapping of routing locators and addresses of the plurality of wireless APs in the network fabric; and registering, as entries in the replication list, the plurality of routing locators associated with the addresses of the set of handoff candidate wireless APs in association with the address of the wireless endpoint. In some implementations, the method may involve the performance of yet additional steps at the map server, which involve communicating, to a router, a message to notify the router to populate, as entries in the replication list, the plurality of routing locators in association with the address of the wireless endpoint, for replication of packets intended for the wireless endpoint to a plurality of routers that are connected to the set of handoff candidate wireless APs.

A computer program product may include a non-transitory computer readable medium and instructions in the non-transitory computer readable medium, where the instructions are executable by one or more processors for performing the methods described herein. A computing device, such as a network node or a user device, may include one or more processors, one or more interfaces to connect in a network, and one or more memory elements for storing instructions executable on the one or more processors for performing the methods described herein.

Figure 9:
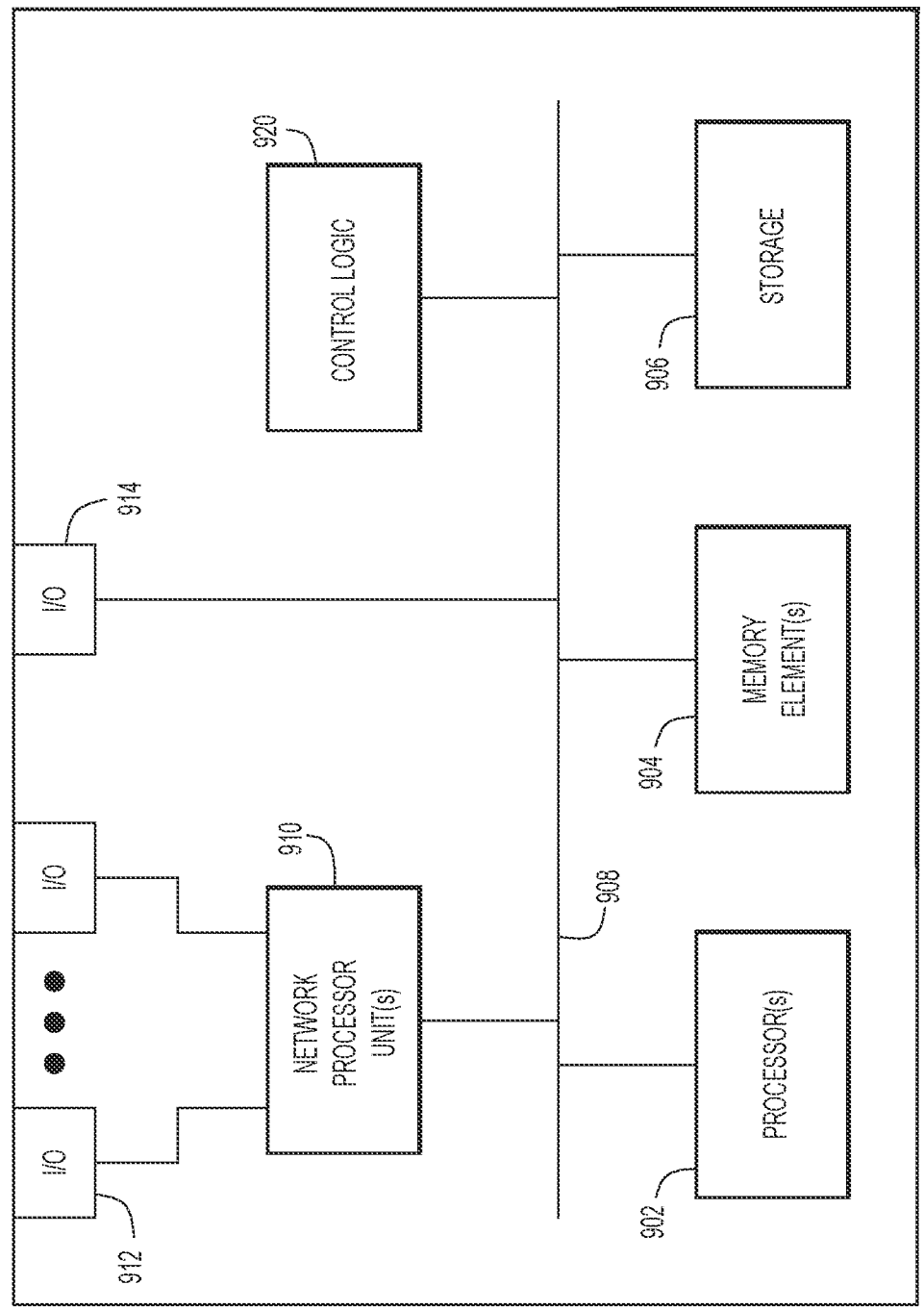
FIG. 9 illustrates a hardware block diagram of a computing device that may perform functions associated with operations discussed herein.

FIG. 9 illustrates a hardware block diagram of a computing device 900 that may perform functions associated with operations discussed herein in connection with the techniques described in relation to the above figures, especially in relation to FIGS. 5A-5B, 6A-6B, 7, and FIGS. 8A-8D. In various embodiments, a computing device, such as computing devices 900 or any combination of computing devices 900, may be configured as any entity/entities as discussed for the techniques depicted in connection with the figures in order to perform operations of the various techniques discussed herein.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but re not limited to, any LAN, VLAN, WAN (e.g., the Internet), software defined WAN (SD-WAN), wireless local area (WLA) access network, wireless wide area (WWA) access network, metropolitan area network (MAN), Intranet, Extranet, VPN, Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IPv4 and/or IPv6 addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed at a wireless local area network (LAN) controller (WLC) associated with a network fabric or at a cloud server, the method comprising:
    obtaining, by the WLC or the cloud server, telemetry data associated with the network fabric, the telemetry data including signal strength information associated with a plurality of wireless access points (APs) of the network fabric;
    identifying, by the WLC or the cloud server, that a signal strength between a current wireless AP and a wireless endpoint is below a first threshold based on the signal strength information included in the telemetry data;
    based on the identifying:
        selecting, by the WLC or the cloud server, addresses of a set of handoff candidate wireless APs for the wireless endpoint based on the signal strength information included in the telemetry data, wherein the selecting by the WLC or the cloud server includes:
            selecting a plurality of neighboring wireless APs of the current wireless AP; and
            for each one of the plurality of neighboring wireless APs of the current wireless AP, selecting a corresponding neighboring wireless AP to be included in the set of handoff candidate wireless APs based on identifying that a signal-to-noise ratio (SNR) between the corresponding neighboring wireless AP and the wireless endpoint is above a second threshold; and
        communicating, by the WLC or the cloud server, to a map server, a message to register, as entries in a replication list, a plurality of routing locators associated with the addresses of the set of handoff candidate wireless APs for association with an address of the wireless endpoint.

2. The method of claim 1, further comprising:
    identifying that a new signal strength between a newly-associated current wireless AP and the wireless endpoint is above a third threshold based on the signal strength information, and based on the identifying:
        communicating, to the map server, a message to remove, as entries in the replication list, the plurality of routing locators associated with the addresses of the set of handoff candidate wireless APs.

3. The method of claim 1, further comprising:
    maintaining access to data associated with the plurality of wireless APs of the network fabric, wherein the data are stored with a spatial indexing,
    wherein selecting the plurality of neighboring wireless APs further comprises selecting, with use of the spatial indexing of the data, a specified area that surrounds a geographic location of the current wireless AP.

4. The method of claim 1, further comprising:
    at the map server,
        receiving the message to register, as entries in the replication list, the plurality of routing locators associated with the addresses of the set of handoff candidate wireless APs for association with the address of the wireless endpoint;
        selecting the plurality of routing locators associated with the addresses of the set of handoff candidate wireless APs, based on a stored mapping of routing locators and addresses of the plurality of wireless APs of the network fabric; and
        registering, as entries in the replication list, the plurality of routing locators associated with the addresses of the set of handoff candidate wireless APs in association with the address of the wireless endpoint.

5. The method of claim 4, further comprising:
    at the map server,
        communicating, to a router, a message to notify the router to populate, as entries in the replication list, the plurality of routing locators in association with the address of the wireless endpoint, for replication of packets intended for the wireless endpoint to a plurality of routers that are connected to the set of handoff candidate wireless APs.

6. The method of claim 1, wherein the map server comprises a map server/map resolver (MS/MR) of a Locator/ID Separation Protocol (LISP) control plane for use in the network fabric.

7. A computer program product comprising:
    a non-transitory computer readable medium;
    instructions stored on the non-transitory computer readable medium; and
    the instructions being executable by one or more processors of a computing device that performs operations for a wireless local area network (LAN) controller (WLC) associated with a network fabric or a cloud server for:
        obtaining telemetry data associated with the network fabric, the telemetry data including signal strength information associated with a plurality of wireless access points (APs) of the network fabric;
        identifying that a signal strength between a current wireless AP and a wireless endpoint is below a first threshold based on the signal strength information included in the telemetry data;
        selecting addresses of a set of handoff candidate wireless APs for the wireless endpoint based on the signal strength information included in the telemetry data, wherein the selecting includes:
            selecting a plurality of neighboring wireless APs of the current wireless AP; and
            for each one of the plurality of neighboring wireless APs of the current wireless AP, selecting a corresponding neighboring wireless AP to be included in the set of handoff candidate wireless APs based on identifying that a signal-to-noise ratio (SNR) between the corresponding neighboring wireless AP and the wireless endpoint is above a second threshold; and
        communicating, to a map server, a message to register, as entries in a replication list, a plurality of routing locators associated with the addresses of the set of handoff candidate wireless APs for association with an address of the wireless endpoint.

8. The computer program product of claim 7, wherein the instructions are executable by the one or more processors of the computing device further for:
    identifying that a new signal strength between a newly-associated current wireless AP and the wireless endpoint is above a third threshold based on the signal strength information, and based on the identifying:
        communicating, to the map server, a message to remove, as entries in the replication list, the plurality of routing locators associated with the addresses of the set of handoff candidate wireless APs as entries in the replication list.

9. The computer program product of claim 7, wherein the instructions are executable by the one or more processors of the computing device further for:
maintaining access to data associated with the plurality of wireless APs of the network fabric, wherein the data are stored with a spatial indexing,
wherein selecting the plurality of neighboring wireless APs further comprises selecting, with use of the spatial indexing of the data, a specified area that surrounds a geographic location of the current wireless AP.

10. The computer program product of claim 7, wherein the instructions are executable by the one or more processors of the computing device further for causing the map server to perform operations for:
receiving the message to register, as entries in the replication list, the plurality of routing locators associated with the addresses of the set of handoff candidate wireless APs for association with the address of the wireless endpoint;
selecting the plurality of routing locators associated with the addresses of the set of handoff candidate wireless APs, based on a stored mapping of routing locators and addresses of the plurality of wireless APs of the network fabric;
registering, as entries in the replication list, the plurality of routing locators associated with the addresses of the set of handoff candidate wireless APs in association with the address of the wireless endpoint; and
communicating, to a router, a message to notify the router to populate, as entries in the replication list, the plurality of routing locators in association with the address of the wireless endpoint, for replication of packets intended for the wireless endpoint to a plurality of routers that are connected to the set of handoff candidate wireless APs.

11. A computing device that performs operations for a wireless local area network (LAN) controller (WLC) associated with a network fabric or a cloud server, comprising:
one or more processors;
one or more interfaces to connect in a network fabric; and
one or more memory elements for storing instructions executable by the one or more processors for:
obtaining, by the WLC or the cloud server, telemetry data associated with the network fabric, the telemetry data including signal strength information associated with a plurality of wireless access points (APs) of the network fabric;
identifying, by the WLC or the cloud server, that a signal strength between a current wireless AP and a wireless endpoint is below a first threshold based on the signal strength information included in the telemetry data;
selecting, by the WLC or the cloud server, addresses of a set of handoff candidate wireless APs for the wireless endpoint based on the signal strength information included in the telemetry data, wherein the selecting includes:
selecting a plurality of neighboring wireless APs of the current wireless AP; and
for each one of the plurality of neighboring wireless APs of the current wireless AP, selecting a corresponding neighboring wireless AP to be included in the set of handoff candidate wireless APs based on identifying that a signal-to-noise ratio (SNR) between the corresponding neighboring wireless AP and the wireless endpoint is above a second threshold; and
communicating, by the WLC or the cloud server, to a map server, a message to register, as entries in a replication list, a plurality of routing locators associated with the addresses of the set of handoff candidate wireless APs for association with an address of the wireless endpoint.

12. The computing device of claim 11, wherein the instructions are executable by the one or more processors of the computing device further for:
identifying that a new signal strength between a new current wireless AP and the wireless endpoint is above a third threshold based on the signal strength information, and based on the identifying:
communicating, to the map server, a message to remove, as entries in the replication list, the plurality of routing locators associated with the addresses of the set of handoff candidate wireless APs.

13. The computing device of claim 11, wherein the instructions are executable by the one or more processors further for:
maintaining access to data associated with the plurality of wireless APs of the network fabric, wherein the data are stored with a spatial indexing,
wherein selecting the plurality of neighboring wireless APs comprises selecting, with use of the spatial indexing of the data, a specified area that surrounds a geographic location of the current wireless AP.

14. The computing device of claim 11, wherein the instructions are executable by the one or more processors of the computing device for causing the map server to perform operations for:
receiving the message to register, as entries in the replication list, the plurality of routing locators associated with the addresses of the set of handoff candidate wireless APs for association with the address of the wireless endpoint;
selecting the plurality of routing locators associated with the addresses of the set of handoff candidate wireless APs, based on a stored mapping of routing locators and addresses of the plurality of wireless APs of the network fabric;
registering, as entries in the replication list, the plurality of routing locators associated with the addresses of the set of handoff candidate wireless APs in association with the address of the wireless endpoint; and
communicating, to a router, a message to notify the router to populate, as entries in the replication list, the plurality of routing locators in association with the address of the wireless endpoint, for replication of packets intended for the wireless endpoint to a plurality of routers that are connected to the set of handoff candidate wireless APs.

15. The method of claim 2, further comprising:
at the map server,
based on receiving the message, removing, as entries in the replication list, the plurality of routing locators associated with the addresses of the set of handoff candidate wireless APs; and
communicating, by the map server to an ingress tunnel router of the network fabric, a message to notify the ingress tunnel router to remove, as entries in the replication list, the plurality of routing locators associated with the address of the wireless endpoint.

16. The method of claim 5, wherein the router is an ingress tunnel router of the network fabric.

17. The method of claim 1, wherein the plurality of routing locators associated with the set of handoff candidate wireless APs are associated with each of a plurality of egress tunnel routers that are connected to the set of handoff candidate wireless APs.

18. The computer program product of claim 7, wherein the plurality of routing locators associated with the set of handoff candidate wireless APs are associated with each of a plurality of egress tunnel routers that are connected to the set of handoff candidate wireless APs.

19. The computing device of claim 11, wherein the plurality of routing locators associated with the set of handoff candidate wireless APs are associated with each of a plurality of egress tunnel routers that are connected to the set of handoff candidate wireless APs.

20. The computing device of claim 11, the map server comprises a map server/map resolver (MS/MR) of a Locator/ID Separation Protocol (LISP) control plane for use in the network fabric.

\* \* \* \* \*